US010467825B2

(12) United States Patent
Herlihy et al.

(10) Patent No.: US 10,467,825 B2
(45) Date of Patent: Nov. 5, 2019

(54) AIRFRAME HEALTH MONITOR

(71) Applicant: DRONE RACING LEAGUE, INC., New York, NY (US)

(72) Inventors: Phil Herlihy, New York, NY (US); Nate Ferris, New York, NY (US); Trevor Smith, New York, NY (US); Ryan Gury, New York, NY (US)

(73) Assignee: Drone Racing League, Inc., New York, NY (US)

( * ) Notice: Subject to any disclaimer, the term of this patent is extended or adjusted under 35 U.S.C. 154(b) by 168 days.

(21) Appl. No.: 15/706,477

(22) Filed: Sep. 15, 2017

(65) Prior Publication Data
US 2019/0088046 A1   Mar. 21, 2019

(51) Int. Cl.
*G07C 5/08* (2006.01)
*B64F 5/60* (2017.01)
(Continued)

(52) U.S. Cl.
CPC .......... *G07C 5/0816* (2013.01); *B64C 39/024* (2013.01); *B64F 5/60* (2017.01); *G01M 5/0016* (2013.01); *G01M 5/0033* (2013.01); *G01M 5/0041* (2013.01); *G01M 5/0083* (2013.01); *G05D 1/0066* (2013.01); *G07C 5/085* (2013.01); *B64C 2201/126* (2013.01)

(58) Field of Classification Search
None
See application file for complete search history.

(56) References Cited

U.S. PATENT DOCUMENTS

| 9,064,357 | B1 | 6/2015 | McCormick |
| 2007/0118301 | A1* | 5/2007 | Andarawis ............ G01M 5/00 |
| | | | 702/33 |

(Continued)

FOREIGN PATENT DOCUMENTS

CN    105928695    9/2016

OTHER PUBLICATIONS

Eckstrom, et al., "Flight Assessment of a Large Supersonic Drone Aircraft for Research Use,"; Langley Research Center, National Aeronautics and Space Administration, Washington, D. C.; Dec. 1975.

(Continued)

*Primary Examiner* — Rami Khatib
(74) *Attorney, Agent, or Firm* — Vierra Magen Marcus LLP

(57) ABSTRACT

An airframe health monitoring system uses a controller to automatically determine a status of the airframe of an aircraft in real time, at power up and periodically during flight of the aircraft, based on the output of pressure sensors such as ribbon sensors and flex sensors mounted on the airframe arms and body. The controller can determine in real time whether the airframe has a fault or is damaged based on continuity measured in ribbon sensors located along the outside surfaces of the airframe. The controller can also determine a metric on the status of the airframe in real time based on arm impulses measured in flex sensors located along inside surfaces of arms of the airframe. This will lead to less expensive, more accurate, faster, automated detection of airframe faults, airframe damage and/or metrics on the health of the airframe.

23 Claims, 12 Drawing Sheets

(51) Int. Cl.
    *B64C 39/02*     (2006.01)
    *G05D 1/00*     (2006.01)
    *G01M 5/00*     (2006.01)

(56) References Cited

U.S. PATENT DOCUMENTS

| | | | |
|---|---|---|---|
| 2008/0011091 A1* | 1/2008 | Weldon, Jr. | G01L 1/255 |
| | | | 73/766 |
| 2009/0153144 A1* | 6/2009 | Hansen | G05B 23/0229 |
| | | | 324/511 |
| 2009/0306909 A1 | 12/2009 | Mattes | |
| 2010/0017049 A1* | 1/2010 | Swearingen | G08G 5/0021 |
| | | | 701/3 |
| 2011/0245999 A1* | 10/2011 | Kordonowy | G07C 5/0816 |
| | | | 701/3 |

OTHER PUBLICATIONS

PCT International Search Report dated Nov. 5, 2018, PCT Patent Application PCT/US2018/047486.
PCT Written Opinion of the International Searching Authority dated Nov. 5, 2018, PCT Patent Application PCT/US2018/047486.

* cited by examiner

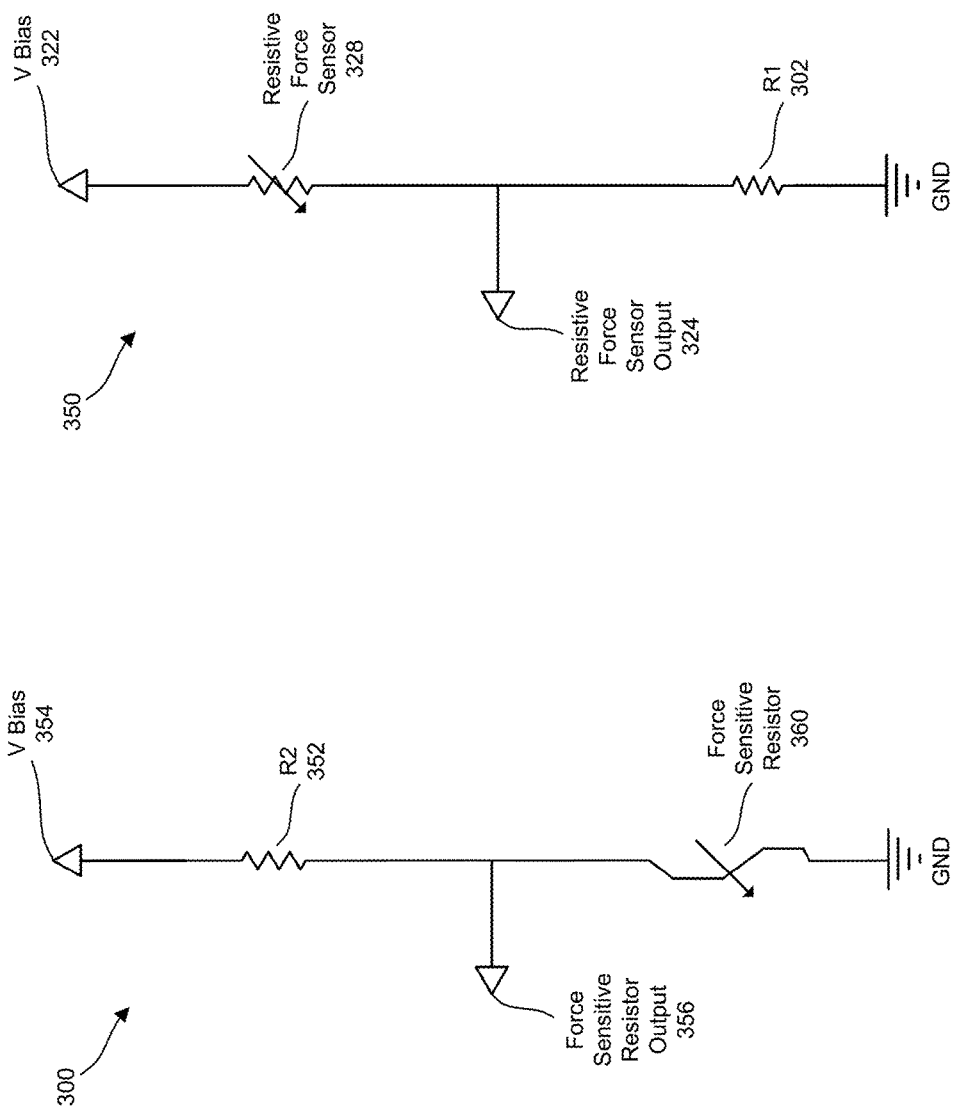

AIRFRAME HEALTH MONITOR

BACKGROUND

The technology described herein relates to an airframe health monitoring system that can be used for monitoring the status of an airframe of an aircraft such as a high speed radio controlled unmanned aircraft (i.e. drones) in real time, as well as for monitoring the status of other types of airframes.

Existing airframe status monitoring systems may not properly monitor the status of an aircraft airframe at power up and during flight of the aircraft. For example, existing systems may not sufficiently monitor the status of an airframe of high speed radio controlled unmanned aircraft in real time. Such monitoring may be important during certain events such as when the aircraft is used for security, deliveries or competitions.

SUMMARY OF THE DRAWINGS

FIG. 3A is an electronic schematic diagram of one embodiment of a circuit that includes a pressure sensor that is a force sensitive resistor (FSR) sensor.

FIG. 3B is an electronic schematic diagram of one embodiment of a circuit that includes a pressure sensor that is a resistive force sensor (RFS).

DETAILED DESCRIPTION

Figure 1:
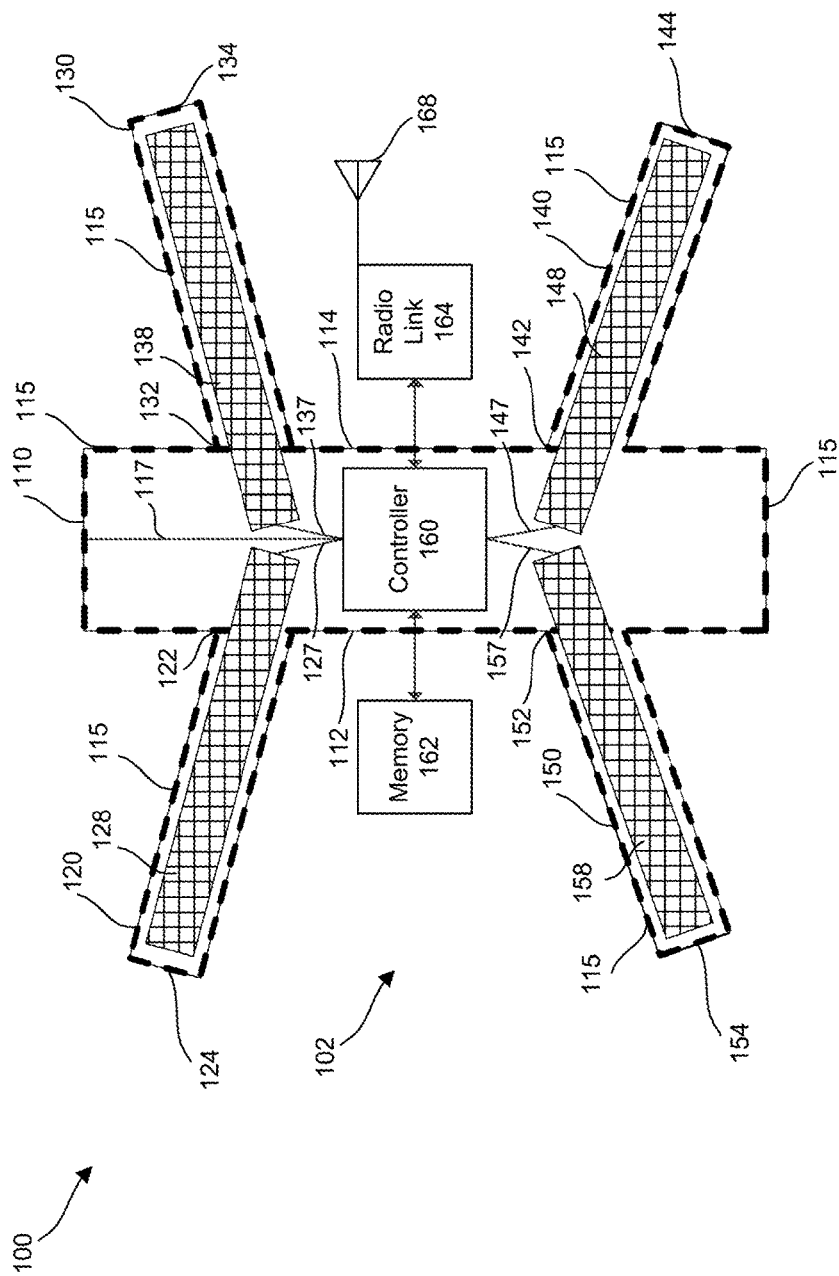
FIG. 1 is a block diagram of one embodiment of a system for monitoring the health of an airframe, showing certain components on an airframe.

One embodiment of a proposed solution for monitoring the health of an airframe of an aircraft is to monitor the outputs of pressure sensors (e.g., forces sensors) mounted on the airframe in real time, at power up and during flight of the aircraft. For example, an airframe status monitoring system can use pressure sensors mounted on an airframe to measure stress at the airframe. The pressure sensors may be described as force sensors, ribbon sensors, continuity sensors, force sensitive resistors (FSRs), resistive force sensors (RFS), and/or flex sensors. The pressure sensors can be electrically connected to a controller mounted on the airframe that can determine a status of the airframe in real time based on outputs of the pressure sensors. Based on the outputs, the controller may determine if there is airframe damage, determine whether there is an airframe fault, and/or provide metrics on the health of the airframe (e.g., as telemetry data for current or later analysis). These determinations may be important during certain events, such as during a competition or race of the aircraft.

More particularly, as part of determining the status of the airframe, the controller may automatically determine in real time whether the airframe has a physical fault or is physically damaged (e.g., the status is that the airframe has a fault or is damaged) at power up of the aircraft and periodically in real time during flight of the airframe, based on the output of the pressure sensors. In these cases, the pressure sensors may be "ribbon sensors" such as force sensitive resistor (FSR) sensors mounted along outside surfaces around the perimeter of the body and/or arms of the airframe, to detect impacts to the airframe at the sensors. The automatic determination of a fault or damage can made be during flight, during a crash, during arm flex impulses and/or during impacts upon the airframe. In one embodiment, determining the fault or damage to the airframe may occur when the output of one of the pressure sensors is beyond acceptable values set during calibration. In some cases, the determined fault or damage may indicate a permanent bend or break of the surface or structure of the airframe, or may be an indication that the aircraft will not fly properly (e.g., due to the fault or damage). As a result of such a fault for damage, the aircraft controller or ground station may send a command causing the aircraft to discontinue flying, to land, and/or to power down.

In some cases, as part of determining the status of the airframe, the controller may automatically determine a metric on a health of the airframe in real time, at power up of the aircraft and periodically in real time during flight of the airframe, based on the output of the pressure sensors. These metrics can be arm impulses resulting from force created by a propulsion source (e.g., on the arm) of the aircraft. These metrics can include airframe dynamics during flight, during a crash and during other physical impulses to produce arm flex impulse telemetry data for later analysis. In these cases, the pressure sensors may be "flex sensors" such as resistive force sensors (RFSs) mounted on inside surfaces of the airframe, such as along inside surfaces of arms (or wings) of the airframe, to detect flexing along the arms at the sensors.

These metrics can also be automatically detected, stored in a memory of the aircraft by the controller and/or transmitted by radio from the controller to a ground station, such as to provide telemetry data for later analysis.

In one embodiment, the metrics can also be used to determine a fault or damage to the airframe, such as when the arm flex impulse data is beyond acceptable values set during calibration. As a result of such a fault or damage, the aircraft controller or ground station may send a command causing the aircraft to discontinue flying, to land, and/or to power down.

This system may be useful for automatically monitoring the status of an airframe of a high speed radio controlled unmanned aircraft (i.e. drones) in real time. This system will provide less expensive, more accurate, faster, automated detection of airframe faults, airframe damage and/or metrics on the health of the airframe. Descriptions herein of an airframe health monitoring system or monitoring the health of the airframe may include various embodiments described below for determining a status of the airframe.

FIG. 1 is a block diagram of one embodiment of system 100 for monitoring the health of an airframe, showing components on airframe 102 of an aircraft. Airframe 102 is shown having central body 110 and arms 120, 130, 140 and 150 extending outward from sides of body 110, such as to propulsion sources (not shown). For example, arm 120 may have proximal end 122 attached to or integral with side surface 112 of body 110 and extending outwards to distal end 124 of arm 120. Also, arm 130 may have proximal end 132 attached to or integral with opposing side surface 114 (e.g., opposite to surface 112) of body 110 and extending outwards to distal end 134 of arm 130. In addition, arm 140 may have proximal end 142 attached to or integral with side surface 112 of body 110 and extending outwards to distal end 144 of arm 140. Finally, arm 150 may have proximal end 152 attached to or integral with opposing side surface 114 of body 110 and extending outwards to distal end 154 of arm 150.

Airframe 102 may be an airframe of an aircraft that includes carbon fiber, fiberglass, aluminum, and/or other materials know to be part of such an airframe. Is same cases, it may be a carbon fiber airframe of a drone. For some embodiments, the material of body 110 is the same as that of the arms. In other embodiments, the arms may be a different material than the body.

FIG. 1 also shows pressure sensors 115, 128, 138, 148 and 158 mounted on airframe 102. Consequently, one embodiment of a solution for monitoring the status of airframe 102 in real time, is to monitor the output of pressure sensors 115, 128, 138, 148 and 158. For example, airframe status monitoring system 100 can use these pressure sensors to measure stress at the airframe 102 at power up and during flight of the aircraft (having airframe 102).

More specifically, FIG. 1 shows pressure sensor 115 mounted on a perimeter of outside surfaces of airframe 102. Sensor 115 which may be one or more pressure sensors mounted on outside surfaces of arms 120, 130, 140 and 150. In some cases, sensor 115 is mounted around a perimeter of the airframe along the outside surfaces (e.g., on outside surfaces) that extend from the front and back of body 110, along arms 120-150 to near distal ends 124, 134, 144 and 154 of those arms. In some cases, sensor 115 may represent separate sensors, each mounted over outside surfaces of the arms (but not on the body) as shown and discussed below for FIG. 2A.

In some embodiments, outside surfaces of body 110 and/or arms 120, 130, 140 and 150 where sensor 115 is mounted may have milled areas or sections (not shown) where sensor 115 is mounted. The milled sections may be an areas of airframe 102 with depth that is sufficient for sensor 115 to be installed and integrated into the frame without the sensor top surface being above the outer surface of airframe 102. In some cases, the milled sections may be areas and have height so that the existence of sensor 115 does not affect the flight aerodynamics of the airframe. Sensor 115 may be mounted onto the outside surface of the airframe (e.g., in the milled areas) using a glue, tape or an adhesive, such as coating the back of the sensor or a package enclosing the sensor.

Sensor 115 may be configured to measure stress at airframe 102. For instance, it may be a pressure sensor capable of measuring pressure, force, impacts, damage and/or a fault at an outside surface of body 110 and/or arms of airframe 102. For example, it may measure this pressure, force, impact, damage and/or a fault in the incoming direction with respect to the outside surface where the sensor is located (e.g., with respect to FIG. 1). In one embodiment, sensor 115 may be one or more "ribbon sensors" such as a force sensitive resistor (FSR) sensor or a continuity sensor mounted on surfaces of the airframe (e.g., see sensor 360 of FIG. 3A and 3C).

In some cases, the airframe has an outer shell (not shown) that covers or is disposed outside of the outer surface and sensors of the airframe. The shell may help protect the airframe against minor impacts. For example, the impacts to the airframe 102 at sensor 115 may be reduced by an outer shell or cover, such as a thin plastic shell that covers most of the outer surface of the airframe. In some cases, the outer shell will repel frivolous damage to the sensor 115 and airframe 102, leaving only strong impacts as potential events recorded by sensor 115. The shell may cover sensor 115 and arms 120-150, except where the propulsion sources are located.

Also, in more detail, FIG. 1 shows pressure sensor 128 mounted on airframe 102. Sensor 128 may be one pressure sensor mounted inside of arm 120. In some cases, it is mounted on inside surfaces of arm 120 and extends from proximal end 122, along arm 120 to distal end 124. In some examples, it is mounted on inside surfaces of, and extends from, a portion of body 110, along arm 120 to near distal end 124. In some cases, it extends from inside surfaces of the center of body 110 (e.g., a location between surfaces 112 and 114, see the location shown for connection 117 as an example), along inside surfaces of arm 120, to distal end 124. It can be appreciated that sensor 128 may represent more than one pressure sensor, mounted and functioning as described herein for sensor 128. In one example, sensor 128 may be mounted onto the inside surface of the arm using a glue, tape or an adhesive, such as coating the back of the sensor or a package enclosing the sensor. In one embodiment, sensor 128 can be mounted on a circuit board or other component inside the airframe, such as along arm 120 as noted above.

Sensor 128 may be configured to measure stress at airframe 102. For instance, it may be a pressure sensor capable of measuring pressure at, force at, bending of and/or flexing of end 124 of arm 120 with respect to body 110 (e.g., the center of body 110). It may measure this force and/or flex in the directions of force provided by the propulsion source mounted on arm 120 (e.g., at or near proximal end 124). For example, it may measure this force and/or flex in the up and down direction (e.g., into and out of the page) with respect to FIG. 1. In some cases, sensor 128 may be a "flex sensor" such as resistive force sensor (RFS) mounted inside the airframe (e.g., see sensor 328 of FIG. 3B and 3C).

FIG. 1 shows pressure sensors 138, 148 and 158 mounted on the airframe 102. Sensors 138, 148 and 158 may each be one pressure sensor mounted inside of arms 130, 140 and 150, respectively. Sensors 138, 148 and 158 may be one or more pressure sensors mounted on inside surfaces of and extend from a portion of body 110 or arms 130, 140 and 150 (respectively); along arms 130, 140 and 150 (respectively);

to or near distal ends 134, 144 and 154 (respectively); as explained for sensor 128 and arm 120. For example, sensors 138, 148 and 158 may be mounted onto the inside surfaces of the airframe using a glue, tape or an adhesive, such as coating the back of the sensor or a package enclosing the sensor.

Sensors 138, 148 and 158 may each be configured to measure stress at the airframe 102 and arms 130, 140 and 150 (respectively), as described for sensor 128 measuring stress at the airframe 102 and arm 120. In some cases, sensors 138, 148 and 158 may each be a "flex sensor" such as resistive force sensor (RFS), as described for sensor 128. In some cases, sensors 138, 148 and 158 may each mounted on arms 130, 140 and 150 (respectively), to detect flexing along of the distal ends of the arms with respect to body 110, such as described for sensor 128 being mounted on arm 120 to detect flexing along that arm.

FIG. 1 shows aircraft controller 160 mounted on (and/or in) the airframe 102. Controller 160 may be a computer controller mounted inside of body 110. Controller 160 may be a computer controller (e.g., a microcontroller) that was reset with new firmware (e.g., ROM data) at a factory that produces or packages the controller. The controller may be "calibrated" for the sensor outputs, such as described "calibrating" after step 440 of FIG. 4A (see below). In some instances, controller 160 may represent one or more controllers having the functionality described for controller 160.

In one embodiment, controller 160 may be a controller mounted on airframe 102 and electrically connected to pressure sensors 115, 128, 138, 148 and 158 to determine a status of the airframe, "periodically" in real time. Controller 160 may be configured to determine this status based on output of one or more of pressure sensors 115, 128, 138, 148 and 158 (see also pressure sensors of FIGS. 2A-3C).

Next, FIG. 1 shows electrical connection 117, such as an electrical coupling to send and receive electrical signals between controller 160 and a circuit including sensor 115. This coupling may be attached to electrical signal leads of controller 160 and a circuit including sensor 115, such as to apply a voltage bias to one lead of the circuit including sensor 115 and receive an output voltage at a second lead of the circuit including sensor 115 (e.g., see circuits 300 and 300A-D of FIG. 3A and 3C). The output voltage may be due to a resistance change of sensor 115 which indicates the amount or degree of pressure at, force at, impact at, damage to and/or a fault of airframe 102 in the incoming direction with respect to the outside surface of the airframe where the sensor is located (e.g., see FIGS. 1-2A).

FIG. 1 also shows electrical connection 127, such as an electrical coupling to send and receive electrical signals between controller 160 and a circuit including sensor 128. This coupling may be attached to electrical signal leads of controller 160 and a circuit including sensor 128, such as to apply a voltage bias to one lead of the circuit including sensor 128 and receive an output voltage at a second lead of the circuit including sensor 128 (e.g., see circuits 350 and 350A-D of FIG. 3B and 3C). The output voltage may be due to a resistance change of sensor 128 which indicates the amount or degree of force and/or flexing of arm 120 in the up and down direction (e.g., into and out of the page) with respect to where the sensor is located (e.g., see FIGS. 1-2A).

FIG. 1 also shows electrical connections 137, 147 and 157, such electrical couplings to send and receive electrical signals between controller 160 and circuits including sensors 138, 148 and 158, respectively, such as described for electrical connection 127 sending and receiving electrical signals between controller 160 and circuits including sensor 128.

In some cases, connections 117, 127, 137, 147 and 157 may include one or more wires and/or conductive traces inside of airframe 102. They may also include connectors for connecting the connections to the controller and circuits including the sensors. These components may be mounted onto inside surfaces, PCBs or other components of the airframe.

FIG. 1 shows memory 162 mounted on (and/or in) the airframe 102. Memory 162 may be a computer memory mounted inside of body 110. Memory 162 may be a memory mounted on airframe 102 and electrically connected to controller 160, and configured to store a status of airframe 102, in real time, such as a status determined based on output of one or more of pressure sensors 115, 128, 138, 148 and 158 (see also pressure sensors of FIGS. 2A-3C).

Memory 162 may be an electronic storage device, such as a random access memory (RAM), read only memory (ROM), flash memory, thumb drive, secure digital (SD) card or other electronic storage device. Memory 162 may represent one or more memories having the functionality described for memory 162.

Memory 162 may be electrically connected to controller 160, such with an electrical coupling to send and receive electrical signals between memory 162 and controller 160, such as described for electrical connection 117 sending and receiving electrical signals between controller 160 and a circuit including sensor 115.

FIG. 1 also shows radio frequency (RF) link 164 and antenna 168 mounted on the airframe 102. RF link 164 may be a radio frequency link or system mounted inside of body 110 that uses antenna 168 to transmit RF signals to a ground station and receive RF signals from a ground station (e.g., see ground station 270 of FIG. 2B). RF link 164 and antenna 168 may represent one or more components having the functionality described for RF link 164. In one embodiment, RF link 164 may be an RF link mounted on airframe 102 and electrically connected to controller 160, and configured to transmit a status of airframe 102, in real time, such as a status determined based on output of one or more of pressure sensors 115, 128, 138, 148 and 158 (see also pressure sensors of FIGS. 2A-3C).

RF link 164 may be electrically connected to controller 160, such with an electrical coupling to send and receive electrical signals between RF link 164 and controller 160, such as described for electrical connection 117 sending and receiving electrical signals between controller 160 and a circuit including sensor 115. RF link 164 may be electrically connected to antenna 168, such with an electrical coupling to send and receive signals between RF link 164 and antenna 168 for transmitting and receiving RF signals at antenna 168.

In some examples, pressure sensors 115, 128, 138, 148 and 158; connections 117, 127, 137, 147 and 157; and controller 160 may be considered aircraft or airframe 102 based components of system 100. In some cases, aircraft or airframe 102 based components of system 100 may also include memory 162 and/or RF link 164 (and antenna 168).

Figure 2A:
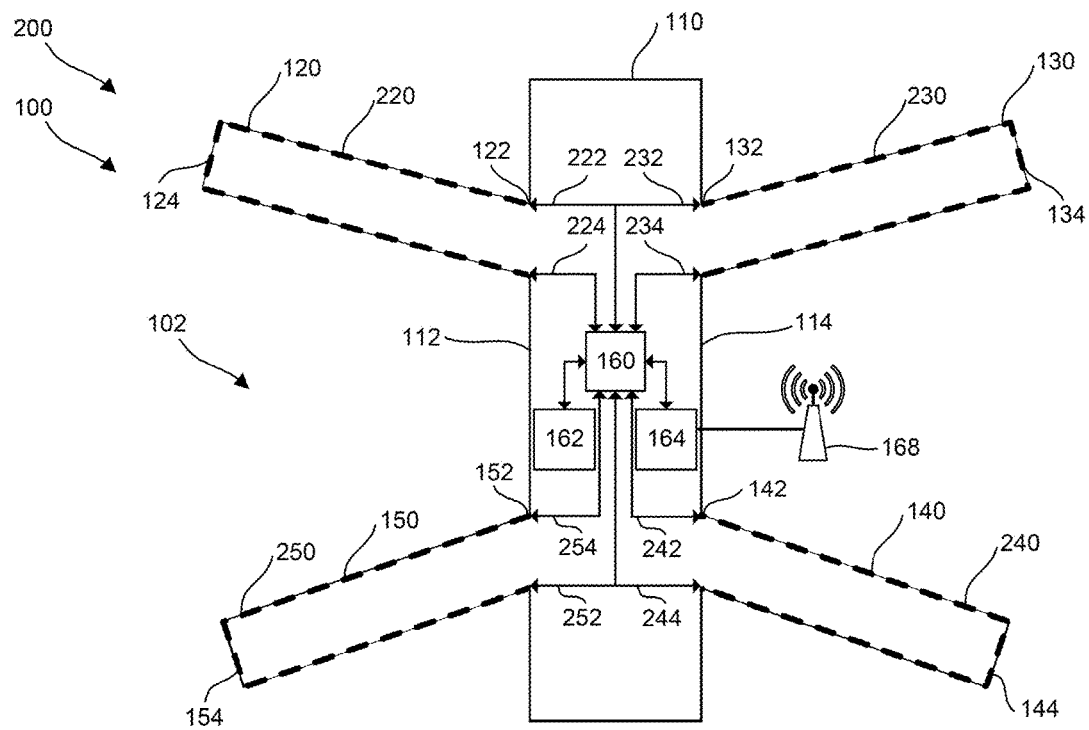
FIG. 2A is a block diagram of one embodiment of a system for monitoring the health of an airframe, showing some components on an aircraft.
Figure 2B:
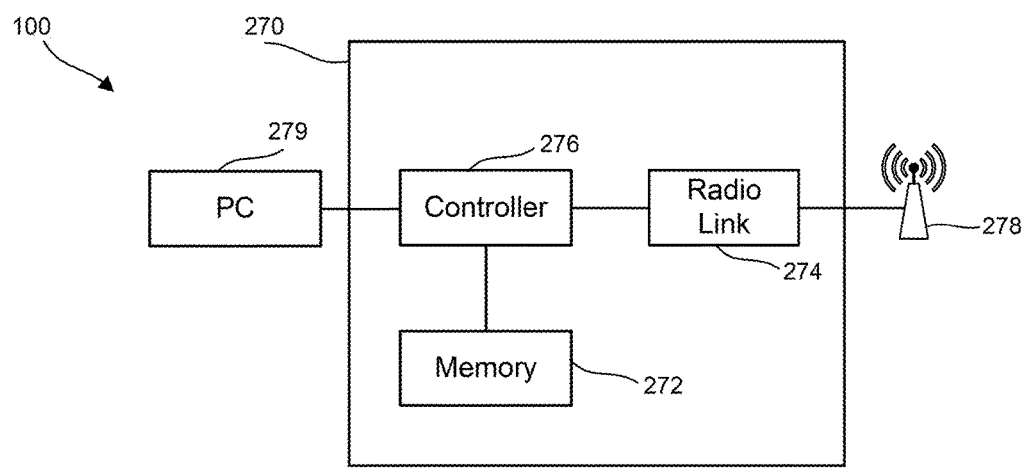
FIG. 2B is a block diagram of one embodiment of a system for monitoring the health of an airframe, showing components of a ground station.

For example, FIG. 2A is a block diagram of one embodiment of a system 100 for monitoring the health of an airframe, showing components on aircraft 200. Some embodiments of system 100 may include other components that are not located on the aircraft or airframe 102, such as components of ground station 270 as shown in FIG. 2B and discussed further below. Aircraft 200 may include airframe 102 and components of system 100 on the airframe shown in FIG. 1.

FIG. 2A, shows an embodiment where sensor 115 is represented as pressure sensors 220, 230, 240 and 250 mounted on arms 120, 130, 140 and 150 of airframe 102, respectively. In some cases each of these sensors extend outward from side surfaces 112 and 114 of body 110 and around the outer perimeter surfaces of the arms. In other cases, each of these sensors extends around the outer perimeter surfaces of the arms and also inwards onto surfaces 112 and 114 (outer perimeter side surfaces) of body 110.

Consequently, one embodiment of a solution for monitoring the status of airframe 102 in real time, is to monitor the output of one or more of pressure sensors 128, 138, 148, 158, 220, 230, 240 and 250. For example, system 100 can use these pressure sensors to measure stress at the airframe 102 at power up and during flight of aircraft 200 (having airframe 102). Pressure sensors 220, 230, 240 and 250 may be described as force sensors, ribbon sensors, continuity sensors, and/or force sensitive resistor (FSR) sensors, as described above for sensor 115.

More specifically, pressure sensor 220 may be one or more pressure sensors mounted on or over outside surfaces of arm 120. In one example, sensor 220 may be mounted around a perimeter of arm 120 along the outside surfaces (e.g., on outside surfaces) that extend from the proximal end 122 of arm 120, along side surfaces of arm 120 and around distal end 124 of arm 120 as shown in FIG. 2A. In one embodiment, sensor 220 may be mounted along or on the outside surfaces of airframe 102 that extend around a perimeter of arm 120 from a portion of body 110, such as side surfaces 112, along side surfaces of arm 120 and around distal end 124 of arm 120.

As described for sensor 115, in some embodiments, outside surfaces of body 110 and/or arms 120 where sensor 220 is mounted may have milled areas or sections (not shown) where sensor 220 is mounted. Sensor 220 may be mounted onto the outside surface of the airframe (e.g., in the milled areas) using a glue, tape or an adhesive, such as coating the back of the sensor or a package enclosing the sensor.

Sensor 220 may be configured to measure stress at airframe 102. For instance, it may be a pressure sensor capable of measuring pressure, force, impacts, damage and/or a fault at outside surfaces of arm 120. In some cases, sensor 220 may be a "ribbon sensor" such as a force sensitive resistor (FSR) sensor mounted along outside surfaces around the perimeter of the arm 120, to detect impacts to arm 120 at sensor 220 (e.g., see sensor 360 of FIGS. 3A and 3C). For example, it may measure this pressure, force, impact, damage and/or a fault in the incoming direction with respect to the outside surface where the sensor is located around arm 120 (e.g., with respect to FIG. 2A). These impacts may be reduced by an outer shell or cover, such as a thin plastic shell that covers most of the outer surface of the airframe, such as described for sensor 115. The shell may cover sensor 220 and arm 120, except where the propulsion source is located.

FIG. 2A shows pressure sensors 230, 240 and 250 mounted on the airframe 102. Sensors 230, 240 and 250 may each be one pressure sensor mounted on or over outside surfaces of arms 130, 140 and 150, respectively. Sensors 230, 240 and 250 may be one or more pressure sensors mounted on outside surfaces of, and extending from, proximal ends 132, 142, 152 (or from body 110); along side surfaces of arms 130, 140 and 150 (respectively); and around distal ends 134, 144 and 154 (respectively), as explained for sensor 220 and arm 120. Sensors 230, 240 and 250 may each be configured to measure stress at airframe 102 and impacts at outside surfaces of arms 130, 140 and 150 (respectively), as described for sensor 220 measuring stress at the airframe 102 and impact at arm 120. In some cases, sensors 230, 240 and 250 may each be a "ribbon sensor" such as FSR sensors as described for sensor 220.

FIG. 2A shows controller 160 mounted on airframe 102 and electrically connected to pressure sensors 220, 230, 240 and 250 to determine a status of the airframe, "periodically" in real time. Controller 160 may be configured to determine this status based on output of one or more of pressure sensors 220, 230, 240 and 250. Controller 160 may also determine a status of airframe 102, in real time, based on output of one or more of pressure sensors 128, 138, 148 and 158 as described for FIG. 1, though these sensors are not shown in FIG. 2A.

For example, FIG. 2A shows electrical connection pair 222 and 224, such as electrical couplings to send and receive electrical signals between controller 160 and a circuit including sensor 220. Connection 222 may be attached to one electrical signal lead of controller 160 and of a circuit including sensor 220, such as to apply a voltage bias to that lead of the circuit including sensor 220 (e.g., see V Bias 354 of FIGS. 3A and 3C). The bias voltage bias may be provided directly from the controller or from another electronic component under instructions from the controller. Connection 224 may be attached to a second electrical signal lead of controller 160 and of the circuit including sensor 220, such as to receive an output voltage at a second lead of the circuit including sensor 220 (e.g., see output 356 of FIGS. 3A and 3C). The output voltage may be due to a resistance change of sensor 220 which indicates the amount or degree of pressure at, force at, impact at, damage to and/or a fault of arm 120 in the incoming direction with respect to the outside surface of the arm where the sensor is located (e.g., see FIG. 2A). These connections may be electrical couplings similar to that described for connection 117 sending and receiving electrical signals between controller 160 and a circuit including sensor 115.

FIG. 2A also shows electrical connection pairs 232 and 234, 242 and 244, 252 and 254, such electrical couplings to send and receive electrical signals between controller 160 and circuits including sensors 230, 240 and 250, respectively, such as described for electrical connection pair 222 and 224 sending and receiving electrical signals between controller 160 and a circuit including sensor 220. In some cases, each connection of pairs 222 and 224, 232 and 234, 242 and 244, 252 and 254, may include one or more wires, connectors and/or conductive traces inside of airframe 102. These components may be mounted onto inside surfaces, PCBs or other components of the airframe.

FIG. 2B is a block diagram of one embodiment of a system 100 for monitoring the health of an airframe, showing components of ground station 270. FIG. 2B shows ground station 270 having radio frequency (RF) link 274 electrically connected to RF antenna 278 and ground controller 276. Controller 276 is electrically connected to memory 272 and computer 279.

Controller 276 may be electrically connected to RF link 274, memory 272 and computer 279, with an electrical coupling to send and receive electrical signals between the controller and each of RF link 274, memory 272 and computer 279, such as described for electrical connection 117 sending and receiving electrical signals between controller 160 and a circuit including sensor 115. RF link 274 may be electrically connected to antenna 278, such with an electrical coupling to send and receive signals between RF link 274 and antenna 278, for transmitting and receiving RF signals at antenna 278.

RF link 274 may be an RF link configured to receive a status of airframe 102, transmitted from RF link 164 in real time.

The status may be received by RF link 274 in a message from RF link 164 (e.g., from controller 160) indicating the detection of the status. Ground station 270 may be configured to receive the signal and detect a real time airframe status based on the status indicated in the received radio frequency signal.

FIG. 2B shows controller 276 of station 270 such as a computer controller (e.g., processor) mounted inside station 270. Controller 276 may be a controller configured to determine a status of airframe 102, in real time, based on or identified in a message received from RF link 164.

Next, FIG. 2B shows memory 272 of station 270, such as a computer memory mounted inside station 270 for storing a status of airframe 102 provided by controller 276. Memory 272 may be configured to store a status of airframe 102, in real time, provided by controller 276. Memory 272 may be an electronic storage device, such as a random access memory (RAM), read only memory (ROM), hard drive, flash memory, thumb drive, secure digital (SD) card or other electronic storage device.

FIG. 2B also shows computer 279 coupled to station 270, such as a computer separate from station 270 for displaying and/or storing a status of airframe 102 provided by controller 276. Computer 279 may be configured to display and/or store a status of airframe 102, in real time, provided by controller 276.

As shown, computer 279 may be a separate component from station 270, such as a computer electrically connected to the station by an Ethernet cable, USB cable, or the like. Computer 279 may be a computing device, such as a desktop computer, a laptop computer, a tablet computer and the like.

FIG. 3A is an electronic schematic diagram of one embodiment of circuit 300 that includes a pressure sensor that is force sensitive resistor (FSR) sensor 360 of system 100. FSR sensor 360 may represent or be any or all of sensors 115, 220, 230, 240 and 250. Circuit 300 has an input at voltage bias, V Bias 354, which is electrically connected to an input of resistor R2 352, and resistor R2 352 output is electrically connected to a FSR sensor output 356 (e.g., one end) of FSR sensor 360, which is also the output of circuit 300. FSR sensor output 356 may be an output (e.g., provide and output signal or voltage) any of sensors 115, 220, 230, 240 and 250, such as described for connections 117, 224, 234, 244 or 254, respectively. All of these outputs may be electrically connected to controller 160 which is configured to determine a status of airframe 102 based on the outputs. V Bias 354 may be an input (e.g., provide and input signal or voltage) of any of circuits 300 having sensors 115, 220, 230, 240 and 250, such as described for connections 117, 222, 232, 242 or 252, respectively. The other end of FSR sensor 360 is electrically connected to ground GND. These electrical connections may be an electrical coupling such as described for connection 117.

For example, each of V Bias 354 may be electrically connected (or electronically coupled) to an input of resistor R2 352, resistor R2 352 output may be electrically connected to an output 356 (e.g., one end) of FSR sensor 360, and the other end of FSR sensor 360 may be electrically connected to ground GND by one or more wires, connectors and/or conductive traces inside of airframe 102. These components may be mounted onto inside surfaces, PCBs or other components of the airframe.

Voltage bias V Bias 354 may be or apply a voltage bias to an input of resistor R2 352 that is a direct current (DC) voltage signal of between 1 and 5 volts at the input of resistor R2 352. In some cases it may be between 3 and 3.5 volts. V Bias 354 may be provided at the input of resistor R2 352, directly from controller 160, or from another electronic component, such as an operational amplifier under instructions from the controller.

Ground GND may be or apply a voltage bias to an input of FSR sensor 360 that is a DC voltage signal of between 0 and 1 volts at the input of FSR sensor 360. In some cases it may be between 0 and 0.5 volts. GND may be provided at the input of FSR sensor 360, directly from the controller 160, or from another electronic component under instructions from the controller.

R2 may have a set resistance of between 100 and 10,000 Ohms between its first and second end. In some cases it may have a set resistance of between 800 and 1200 Ohms.

FSR sensor 360 may have a variable resistance of between 0 and infinite Ohms between its first and second end. In some cases it may have a resistance of between 100 and 100K Ohms. As noted herein, the resistance value of FSR sensor 360 may change depending on the amount of impact onto arm 120 where the sensor is located.

In some cases, FSR sensor 360 may detect physical pressure, squeezing and weight at the sensor. It may have a 0.25-inch wide by 24-inch length sensing area. In some cases it is 0.006 inches thick, 3.5 mm wide, and has a length that extends the length from body 110 (or end 122) around outer side surfaces (e.g., top and bottom of the page of FIGS. 1-2) of arm 120. Pressure anywhere along that area will be detected in the output of the sensor which changes electrical resistive value (e.g., in ohms Ω) between its input and output connectors, depending on how much it is pressed. It may change from 0 ohms with no pressure to a few hundred or a thousand ohms when there is a medium impact that does not permanently damage the surface of arm 120 (e.g., that is not a fault or damage to the airframe). It may change from 0 ohms with no pressure to a few hundred thousand ohms or an open circuit when there is a severe impact that does permanently damage the surface of arm 120 (e.g., that is a fault or damage to the airframe). In some cases, the sensor does not detect where the pressure is on the area.

Considering the changes of resistance of FSR sensor 360 noted above, output 356 of circuit 300 of FSR sensor 360 may be a voltage output in real time from circuit 300 based on the real time values of V bias 354, FSR sensor 360, R2 and GND. Circuit 300 may be described as a voltage divider circuit. Output 356 may be a voltage between V bias 354, and Vout 356=V bias 354×(resistance of R2/(resistance of R2+resistance of FSR sensor 360)). In some cases, Vout 356 may be V bias 354×(resistance of R2/(resistance of R2+resistance of FSR sensor 360)). In some cases it may be between 3.5 and 0 volts.

In some embodiments, output 356 may indicate a resistance change of FSR sensor 360 which indicates the amount or degree of pressure at, force at, impact to, damage to and/or a fault of arm 120 in the incoming direction with respect to the outside surface of the arm where the sensor is located (e.g., see FIGS. 1-2A). In some cases, output 356 may be the output described for connection 224.

FIG. 3B is an electronic schematic diagram of one embodiment of circuit 350 that includes a pressure sensor that is a resistive force sensor (RFS) 328 of system 100. RFS 328 may represent or be any or all of sensors 128, 138, 148 and 158.

For system 100, there may be a difference between a pressure sensor that is FSR sensor 360 and one that is RFS 328. A FSR sensor or ribbon sensor has a resistance between its input and output that may change in response to physical pressure, squeezing or weight at a one or more locations along the sensor's surface. Thus, by detecting an amount of change in resistance in a FSR sensor located on surfaces of the airframe, system 100 can detect pressure or stress at the surface that indicates an impact, damage, fault or break at or of the surface of the airframe along the location of that sensor. The greater the amount of change, the greater the indicated impact or damage.

A RFS or flex sensor has a resistance between its input and output that may change in response to flexing or bending of the sensor at a one or more locations along the sensor. Thus, by detecting an amount of change in resistance in a RFS located within an arm of the airframe, system 100 can detect flexing or stress of the arm that indicates an amount that the arm is flexing. The greater the amount of change, the greater the flexing, which at some point may be great enough to indicate damage to the arm. The amount of RFS resistance change over a period of time may be described as an "arm impulse" such as an indication of the amount of flexing of the arm distal end in a direction over a period of time. In some cases, the impulse may also include a return in resistance of the RFS over a next period of time from the changed amount to the original resistance prior to the change.

Circuit 350 has an input at voltage bias, V Bias 322, which is electrically connected to an input of RFS 328, and RFS output 324 electrically connected to an output of RFS 328. RFS output 324 may be an output (e.g., provide and output signal or voltage) any of sensors 128, 138, 148 or 158, such as described for connections 127, 137, 147 or 157, respectively. All of these outputs may be electrically connected to controller 160 which is configured to determine a status of airframe 102 based on the outputs. V Bias 322 may be an input (e.g., provide and input signal or voltage) of any of circuits 350 having sensors 128, 138, 148 or 158, such as described for connections 127, 137, 147 or 157, respectively. RFS output 324 is also electrically connected to an input (e.g., one end) of resistor R1 302. The other end of resistor R1 302 is electrically connected to ground GND. These electrical connections may be an electrical coupling such as described for connection 117.

For example, each of V Bias 322 may be electrically connected (or electronically coupled) to an input of RFS 328, RFS output 324 may be electrically connected to an output of RFS 328, RFS output 324 may be electrically connected to an input (e.g., one end) of resistor R1 302, and the other end of resistor R1 302 may be electrically connected to ground GND by one or more wires, connectors and/or conductive traces inside of airframe 102. These components may be mounted onto inside surfaces, PCBs or other components of the airframe.

Voltage bias V Bias 322 may be or apply a voltage bias to an input of RFS 328 that is DC voltage signal of between 1 and 5 volts at the input of RFS 328. In some cases it may be between 3 and 3.5 volts. V Bias 322 may be provided at the input of RFS 328, directly from controller 160, or from another electronic component, such as an operational amplifier under instructions from the controller.

Ground GND may be or apply a voltage bias to an output of resistor R1 302 that is DC voltage signal of between 0 and 1 volts at the output of resistor R1 302. In some cases it may be between 0 and 0.5 volts. GND may be provided at the output of resistor R1 302, directly from the controller 160, or from another electronic component under instructions from the controller.

R1 may have a set resistance of between 100 and 10,000 Ohms between its first and second end. In some cases it may have a set resistance of between 800 and 1200 Ohms.

RFS 328 may have a variable resistance of between 1K and 20K Ohms between its first and second end. In some cases it may have a resistance of between 8K and 12K Ohms. As noted herein, the value of RFS 328 may change depending on the amount of flex of arm 120 (e.g., up and down) where the sensor is located.

In some cases, RFS 328 may detect physical pressure, bending and flexing of the sensor, in real time. It may have a 0.25-inch wide by 3.75-inch long sensing area. In some cases it is 0.43 mm (0.017 inches) thick, 0.25 inches wide, and has a length that extends 4.4 inches from body 110 along an inside surface (e.g., flat to the page of FIG. 1-2) of arm 120. It may provide an angle displacement measurement that will be detected in the output of the sensor which changes electrical resistive value (e.g., in ohms $\Omega$) between its input and output connectors, depending on how much it is bent or flexed. It may change from a flat resistance of 10K Ohms±30%, to a maximum bend resistance of at least 2 times greater than the flat resistance at a 180 degree "pinch" bend. In some cases it may have a flat resistance of between 7,000 and 13,000 Ohms Considering the changes of resistance of RFS 328 noted above, output 324 of circuit 350 may output a voltage output in real time from circuit 350 based on the real time values of V bias 322, RFS 328, R1 and GND. Circuit 350 may be described as a voltage divider circuit. Output 324 may be a voltage between V bias 322, and Vout 324=V bias 322×(resistance of RFS 328/(resistance of RFS 328+resistance of R1)). In some cases, Vout 324 may be V bias 322×(resistance of RFS 328/(resistance of RFS 328+resistance of R1)). In some cases it may be between 3.5 and 0 volts.

In some embodiments, output 324 may indicate a resistance change of sensor 128 which indicates the amount or degree of pressure at, force at and/or flexing of arm 120 (e.g., in the up and down direction into and out of the page) with respect to where the sensor is located. In some cases, output 324 may be the output described for connection 127.

Figure 3C:
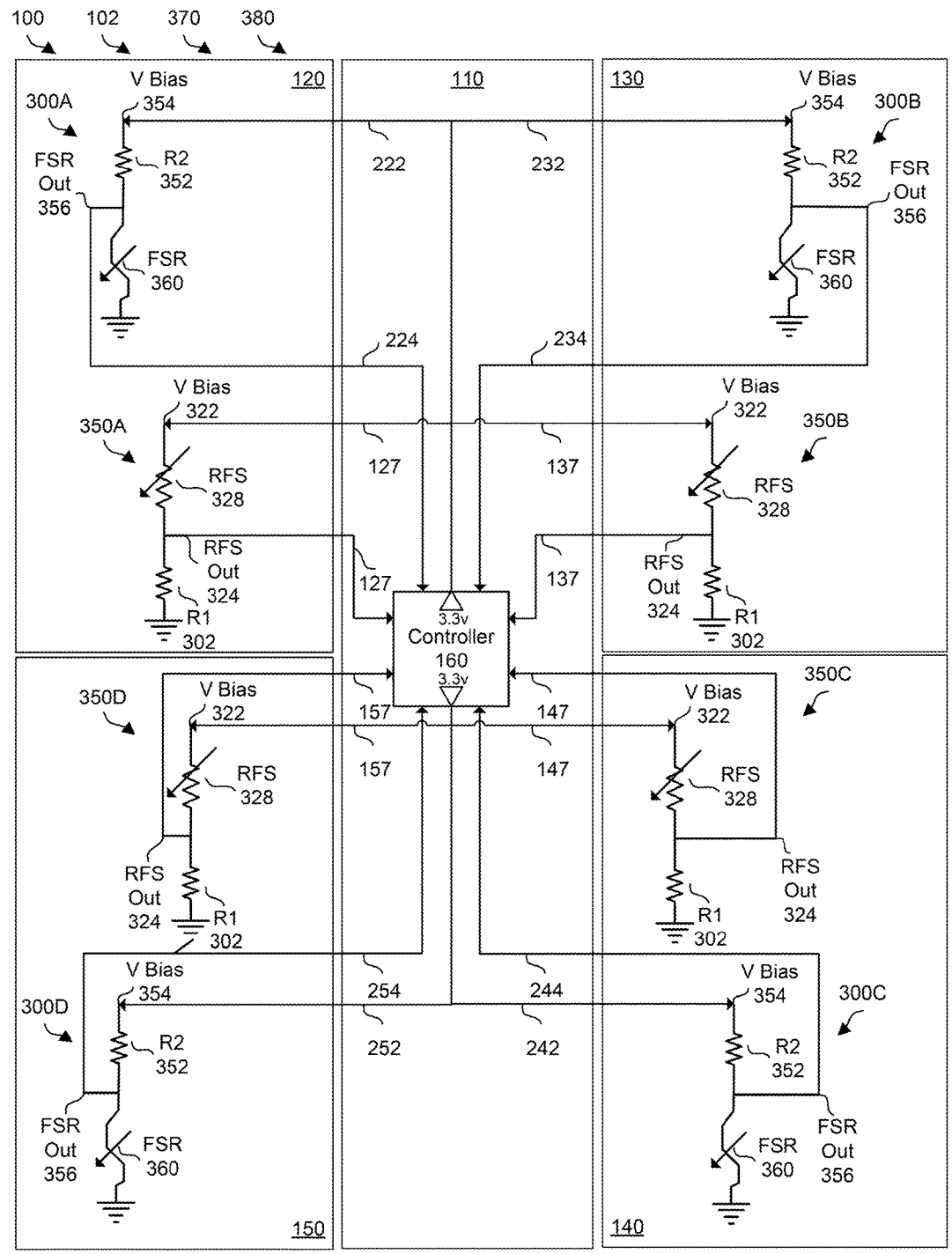
FIG. 3C is an electronic schematic diagram of one embodiment of circuits on an aircraft for a system that monitors the health of an airframe.

FIG. 3C is an electronic schematic diagram 370 of one embodiment of circuits 380 on aircraft 200 for system 100 that monitors the health of an airframe 102 of then aircraft. Diagram 370 shows body 110 having controller 160; arm 120 having FSR sensor circuit 300A and RFS circuit 350A; arm 130 having FSR sensor circuit 300B and RFS circuit 350B; arm 140 having FSR sensor circuit 300C and RFS circuit 350C; and arm 150 having FSR sensor circuit 300D and RFS circuit 350D.

In some cases, in relation to FIGS. 1-2A, FSR sensor circuits 300A, B, C and D have FSR sensors 360 which may be ribbon sensors or FSR sensor versions of sensors 220, 230, 240 and 250, respectively. Similarly, RFS circuits 350A, B, C and D have RFSs 328 which may be flex sensor or RFS versions of sensors 128, 138, 148 and 158, respectively. Also, in relation to FIGS. 3A-B, each of FSR sensor circuits 300A, B, C and D may function similar to sensor circuit 300 of FIG. 3A; and each of RFS circuits 350A, B, C and D may function similar to sensor circuit 350 of FIG. 3B. As discussed, in some embodiments, sensors 360 may extend onto parts of body 110, although not shown that way in FIG. 3C to avoid confusion. Also, in some embodiments, sensors 328 may extend into parts of body 110, although not shown that way in FIG. 3C to avoid confusion.

In FIG. 3C, V Bias 354 (e.g., one input) of each of circuits 300A-D having FSR sensors 360 is electrically connected to a FSR sensor bias voltage generator of controller 160 (e.g., see 3.3 volts); and FSR sensor output 356 (e.g., the output) of each of circuits 300A-D having FSR sensors 360 is electrically connected to an FSR sensor output voltage detector of controller 160 (e.g., see incoming arrows at controller 160). The connections from controller 160 to V Bias 354 of each of circuits 300A-D may be connections 222, 232, 242 and 252, respectively. The connections to controller 160 from outputs 356 of each of circuits 300A-D may be connections 224, 234, 244 and 254, respectively.

Also, V Bias 322 (e.g., one input) of each of circuits 350A-D having RFS 328 is electrically connected to a bias voltage generator of controller 160 (e.g., see 3.3 volts); and RFS output 324 (e.g., the output) of each of circuits 350A-D having RFSs 328 is electrically connected to an RFS output voltage detector of controller 160. The connections from controller 160 to V Bias 322 of each of circuits 350A-D may be represented by connections 117, 127, 137, 147 and 157, respectively. The connections to controller 160 from outputs 324 of each of circuits 350A-D may also be represented by connections 117, 127, 137, 147 and 157, respectively.

All of circuits 300A-D and all of circuits 350A-D may have another end connected to ground as shown. All of these electrical connections may be an electrical coupling such as described for connection 117.

FIG. 3C shows controller outputting a bias voltage of 3.3 volts direct current (DC) as V Bias 354 to the input of each of circuits 300A-D. In response to this V Bias 354 and any change in resistance of FSR 360, each of circuits 300A-D, output FSR output 356 to controller 160, such as described for output 356 of FIG. 3A. In some cases, these changes in resistance of each of FSR 360 of these sensors may be due to pressure, force, impacts, damage or faults as described for FIGS. 1-3A. The FSR outputs 356 of circuits 300A-D are received by controller 160, which can determine a status of airframe 102 in real time based on these outputs.

FIG. 3C shows controller outputting a bias voltage of 3.3 volts DC as V Bias 322 to the input of each of circuits 350A-D. In response to this V Bias 322 and any change in resistance of RFS 328, each of circuits 350A-D, output RFS output 324 to controller 160, such as described for output 324 of FIG. 3B. In some cases, these changes in resistance of each of RFS 328 of these sensors may be due to pressure, force, flexing or arm impulses as described for FIGS. 1-2A and 3B. The RFS outputs 324 of circuits 350A-D are received by controller 160, which can determine a status of airframe 102 in real time based on these outputs.

In one embodiment, controller 160 may have a separate controller channel electrically connected to memory 162, and RF link 164 for (e.g., for processing data of) each of circuit 300A-D and 350A-D As discussed, system 100 may be useful for automatically determining the status of an airframe 102 of an aircraft such as a high speed radio controlled unmanned aircraft (i.e. drones) in real time, as well as for automatically determining the status of other types of airframes. Processes for performing such determining of the status may determine if there is airframe damage, determine whether there is an airframe fault, or provide metrics on the health of the airframe (e.g., based on telemetry data, such as arm impulses), as discussed in more detail below with respect to the flow charts of FIGS.

4A-7. In some cases, processes of FIGS. 4A-7 are processes for monitoring the health of an airframe of an unmanned aircraft or drone in a race.

Figure 4A:
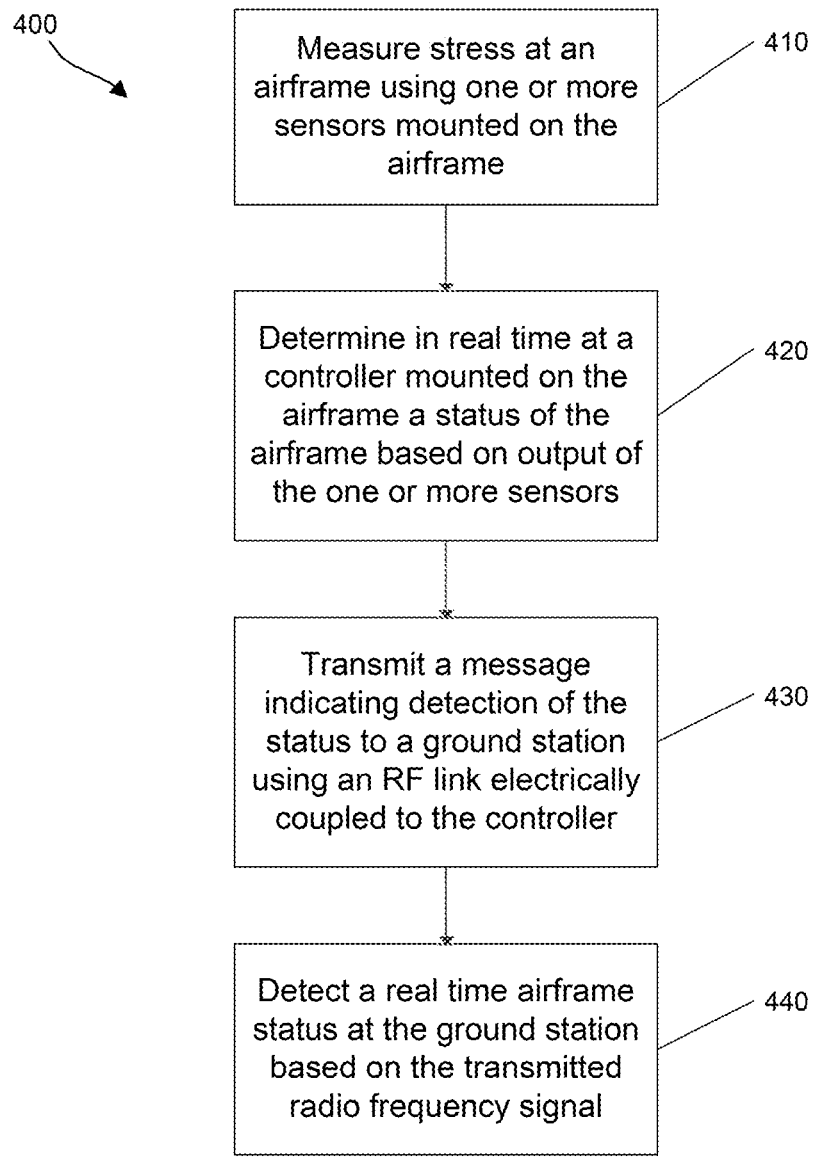
FIG. 4A is a flow chart describing one embodiment of a process for monitoring the health of an airframe based on outputs of one or more pressure sensors.

For example, FIG. 4A is a flow chart describing one embodiment of a process 400 for monitoring the health of an airframe based on output of the one or more pressure sensors. Process 400 may monitor the health of airframe 102 by using system 100 to determine a status of the airframe. In one embodiment, process 400 is performed by controller 160, and optionally includes performance by station 270. FIGS. 4B-E will provide circuit based examples of steps 410 and 420 of process 400; and FIGS. 5-7 will provide additional timing related flow charts related to process 400.

Process 400 starts with step 410, where controller 160 measures stress at airframe 102 using one or more sensors mounted on the airframe. For one example, step 410 may include measuring stress using one or more of sensors 128, 138, 148 and 158 such as described for FIG. 1. In addition, step 410 may include measuring stress using sensor 115, or one or more of sensors 220, 230, 240 and 250 such as described for FIG. 2A. In some cases, it may measure stress using one or more of circuits 300 and 350, or sensors 360 and 328 such as described for FIGS. 3A-C.

In one embodiment, step 410 may include measuring stress at a perimeter of the airframe using sensor 115, or one or more of sensors 220, 230, 240 and 250. More particularly, step 410 may include measuring stress using one or more of these pressure or force sensors mounted on the surface of the airframe and configured to measure stress at the surface of the airframe that extends around a perimeter of the airframe, such as discussed for FIGS. 1-3C. These embodiments of step 410 will be discussed further below.

In some embodiments, step 410 may include measuring stress using one or more of pressure or force sensors 128, 138, 148 and 158 mounted inside arms of the airframe and configured to measure arm impulses along an arm of the airframe, such as discussed for FIGS. 1-3C. These embodiments of step 410 will be discussed further below.

Next, in step 420, controller 160 determines, in real time, a status of airframe 102 based on output of the one or more sensors. Determining the status may be based on the output of the pressure or force sensors described for step 410. In some cases, the outputs are compared with threshold values, such as acceptable values set during calibration, to determine if there is an airframe fault or damage to the airframe, as described herein. This may include comparing the outputs of sensors 115, 220, 230, 240, 250 and/or circuits including sensors 360 with the thresholds.

In addition to determining if there is a fault or damage, the outputs of the sensors may also be stored in memory 162 or transmitted using RF link 164 to ground station 270 as telemetry data, for determining a metric on the health of the airframe. Determining the metric may include subsequently performing an analysis of those outputs such as described for optional step 430 and/or 440. This analysis may include comparing the stored or transmitted outputs by comparing the outputs of sensors 128, 138, 148, 158 and/or circuits including sensors 328 stored in memory 162 or transmitted using RF link 164 to ground station 270 with thresholds during later analysis.

For example, as part of determining the status of the airframe at step 420, controller 160 may determine in real time whether the airframe has a physical fault or is physically damaged at power up and periodically in real time during flight of the airframe, based on the output of sensor 115; sensors 220, 230, 240 and 250; or circuits including sensors 360, such as discussed for FIGS. 1-3C. In another case, as part of determining the status of the airframe at step 420, controller 160 may determine a metric on a health of the airframe in real time, at power up and periodically in real time during flight of the airframe, based on the output of sensors 128, 138, 148 and 158; or circuits including sensors 328, such as discussed for FIGS. 1-3C. In one embodiment, it may determine both at the same time. As noted above, these embodiments of steps 410 and 420 will be now be discussed further.

Now, embodiments are discussed regarding process 400 where controller 160 performs steps 410 and 420 to determine whether airframe 102 has a physical fault or is physically damaged at power up and periodically in real time during flight of the airframe as follows.

At step 410, controller 160 measures stress at a perimeter of airframe 102 using one or more pressure sensors mounted along the perimeter of the airframe that are configured to measure stress at the perimeter of the airframe. For this example, step 410 may include measuring stress using sensor 115; one or more of sensors 220, 230, 240 and 250; or one or more of sensors 360 such as described for FIGS. 1-3C.

After this embodiment of step 410, at step 420, controller 160 may determine in real time whether the airframe has a fault or is damaged based on the stress measured at the perimeter of the airframe as detected in the output of the one or more pressure sensors at step 410.

In some cases, the determination at step 420 includes controller 160 determining in real time whether airframe 102 has a fault based on periodically comparing stresses measured by the sensors or circuits of FIGS. 1-3C in real time at multiple points along the perimeter of the airframe with acceptable baseline stress values for the multiple points set during a calibration process. In one embodiment, if the stress measured in real time at one of the multiple points along the perimeter of the airframe exceeded the acceptable baseline arm stress values for that point set during a calibration process, the controller detects a fault or damage to airframe 102 at that point. In some instances, this one point of multiple points may be at a known location on an arm of the airframe due to the known location of the multiple points of the sensor.

In another embodiment, controller may perform steps 410 and 420 to determine whether airframe 102 has a physical fault or is physically damaged at power up and periodically in real time during flight of the airframe as follows.

At step 410, a perimeter of airframe 102 includes an outer surface of the airframe that extends around arms of the airframe, and controller 160 measures continuity of the outer surface of the arms (e.g., arms 120-150) of the airframe using force sensitive resistor (FSR) sensors (e.g., FSR versions of the sensors) mounted on that outer surface.

For this example, step 410 may include measuring stress using FSR sensor version of sensor 115; one or more of FSR sensors 220, 230, 240 and 250; or one or more of sensors 360 such as described for FIGS. 1-3C.

After this embodiment of step 410, at step 420, controller 160 may determine in real time whether the airframe has a fault or is damaged based on the measured continuity of the outer surface of the arms of the airframe as detected in an output of the one or more force FSR sensors at step 410.

In any of the embodiments above for performing steps 410 and 420 to determine in real time whether airframe 102 has a fault or is damaged, at power up and periodically in real time during flight, controller 160 may poll the sensors or circuits of FIGS. 1-3C in sections (e.g., a section may be for an arm) and check the values within those sections against baseline acceptable values set during initial calibration. If a sensor is out of calibration range (e.g., not between an upper and lower threshold), whether that be significantly diverged from its initial value, or completely unresponsive, a fault is detected by the controller and possibly output to the ground station, indicating a failure of airframe 102 in real time due to a fault or damage.

Figure 4B:
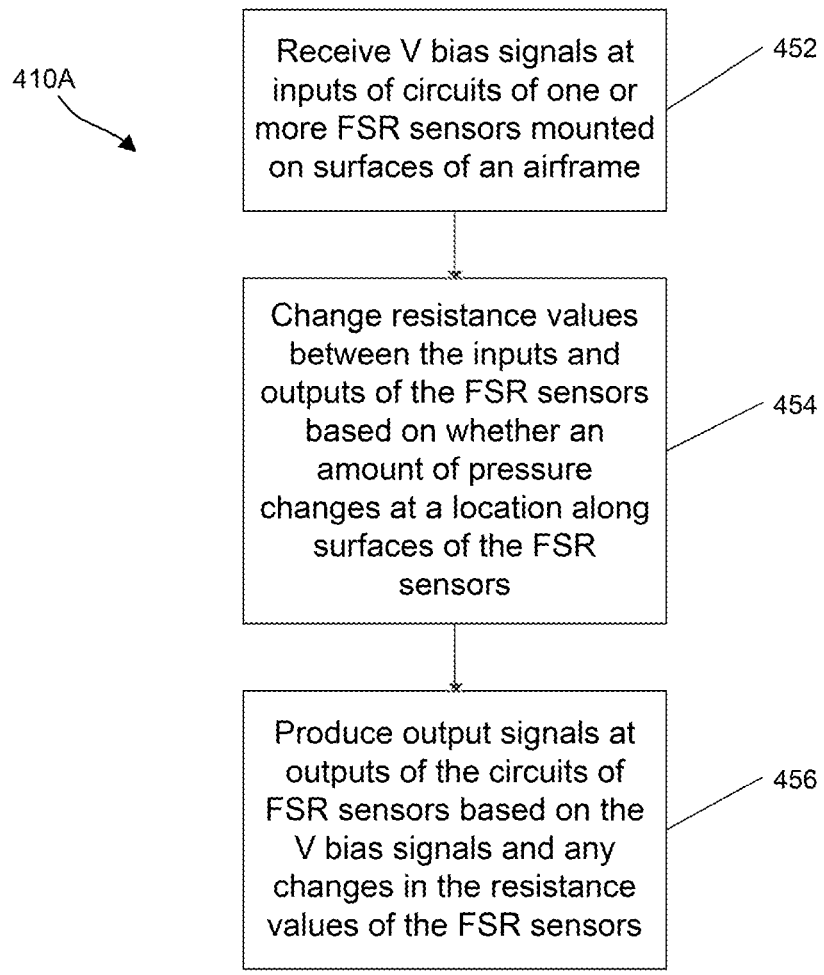
FIG. 4B is a flow chart describing one embodiment of a process for measuring stress at an airframe using FSR sensors mounted on surfaces of the airframe.

For example, FIG. 4B is a flow chart describing one embodiment of process 410A for monitoring the health of airframe 102 that includes measuring stress at the airframe using one or more FSR sensors 460 or ribbon sensors mounted on surfaces of the airframe. Process 410A may be one embodiment of step 410 of process 400.

Process 410A begins with step 452 where V bias signals 354 are received at inputs of circuits 300 or 300A-D of one or more FSR sensors 360 mounted on surfaces of airframe 102. V bias signals 354 may be received at inputs of circuits 300 or 300A-D through electrical connections 222, 232, 242 and 252 as described for FIGS. 2, 3A, 3C and step 410.

At step 454 resistance values may change between the inputs and outputs of the FSR sensors 360 of circuits 300 or 300A-D based on whether an amount of pressure changes at a location along surfaces of the FSR sensors 360. Changing resistance values of the FSR sensors 360 may be in response to pressure changes or impacts at one or more locations along surfaces of the FSR sensors 360 as described for FIGS. 3A, 3C and step 410.

Next, at step 456 output signals 356 are produced at outputs of the circuits 300 or 300A-D of FSR sensors 360 based on the V bias signals 354 and any changes in the resistance values of the FSR sensors 360. Producing output signals 356 may be in response to or based on the V bias signals 354, ground signal GND, and any changes in the resistance values of the FSR sensors 360 as described for FIGS. 3A, 3C and step 410.

Figure 4C:
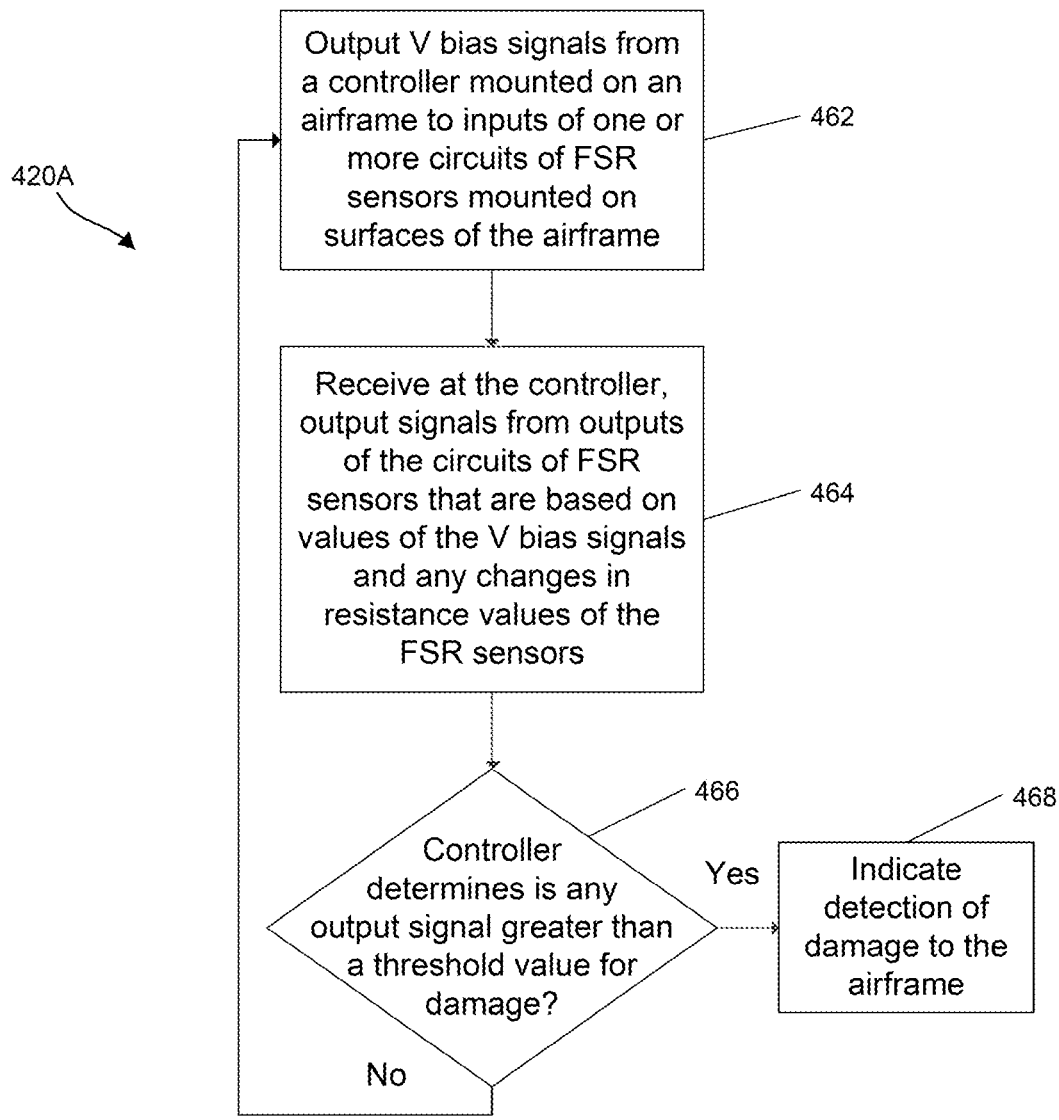
FIG. 4C is a flow chart describing one embodiment of a process for determining whether the airframe is damaged or has a fault based on output of FSR sensors mounted on surfaces of the airframe.

FIG. 4C is a flow chart describing one embodiment of process 420A for monitoring the health of airframe 102 that includes controller 160 determining whether airframe 102 is damaged or has a fault based on output of the circuits 300 of one or more FSR sensors 360 or ribbon sensors mounted on surfaces of the airframe. Process 420A may be one embodiment of step 420 of process 400.

Process 420A begins with step 462 where V bias signals 354 are output from controller 160 mounted on airframe 102 to inputs of one or more circuits 300 or 300A-D of FSR sensors 360 mounted on surfaces of the airframe. V bias signals 354 may be voltages output from controller 160 through electrical connections 222, 232, 242 and 252 to the inputs of circuits 300 or 300A-D as described for FIGS. 2, 3A, 3C and step 420.

At step 464 controller 160 receives output signals 356 from outputs of the circuits 300 or 300A-D of FSR sensors 360 that are based on values of the V bias signals 354 and any changes in resistance values of the FSR sensors 360. Receiving output signals 356 at controller 160 may be through electrical connections 224, 234, 244 and 254 from outputs of the circuits 300 or 300A-D of FSR sensors 360 as described for FIGS. 2, 3A, 3C and 420. Receiving output signals 356 at controller 160 based on values of the V bias signals 354, ground signal GND, and any changes in resistance values of the FSR sensors 360 as described for FIGS. 3A, 3C and step 420.

At step 466, controller 160 determines if any of output signals 356 of the circuits 300 or 300A-D is greater than a threshold value for determining a fault of the airframe 102 or damage to the airframe. Determining if any of output signals 356 is greater than a threshold value may include comparing each of output signals 356 of the circuits 300 or 300A-D with an acceptable value set during calibration, to determine if there is damage to or a fault of the airframe, as described for FIGS. 3A, 3C and step 420.

If none of output signals 356 of the circuits 300 or 300A-D is greater than the threshold for that circuit at step 466, then process 420A returns to step 462.

If any of output signals 356 of the circuits 300 or 300A-D is greater than a threshold for that circuit at step 466, then process 420A continues to step 468. At step 468 detection of damage to the airframe or a fault of the airframe is indicated. Step 468 may include controller 160 shutting down the aircraft, storing the outputs in memory 162, and/or sending a message through RF link 164 to ground station 270, as described for FIGS. 2, 3A, 3C and step 420 (and optionally step 430 and/or 440 below).

Processes 410A and 420A may monitor health of airframe 102 by using system 100 to detect damage to the airframe or a fault of the airframe. In one embodiment, processes 410A and 420A are performed by controller 160, and optionally include performance by station 270.

Now, embodiments are discussed regarding process 400 where controller 160 performs steps 410 and 420 to determine a metric on a health of airframe 102 in real time, at power up and periodically in real time during flight of the airframe as follows.

At step 410, controller 160 measures arm impulses along an arm of airframe 102 using one or more pressure sensors mounted on the airframe. Here, the sensor may be one or more of sensor 128, 138, 148 and 158; or one or more of sensors 328, and the arm may be arm 120, 130, 140 and/or 150, respectively, such as described for FIGS. 1-3C.

After this embodiment of step 410, at step 420, controller 160 may determine a metric on the health of the airframe in real time based on the arm impulses measured along an arm of the airframe as detected in the output of the one or more pressure sensors at step 410. These arm impulses may also be considered "telemetry data", such as described herein. In this case, the arm impulses may include impulse time, a maximum impulse value, a minimum impulse value, and/or a largest impulse deviation. Also, determining the metric may include creating a profile of arm flex according to thrust for the arm by comparing over time, the arm impulses with at least one of a throttle input vector from a pilot for a propulsion source on the arm, or an electronic speed control input vector for the propulsion source. This may occur at controller 160, 276 and/or at computer 279.

In another embodiment, controller may perform steps 410 and 420 to determine a metric on a health of airframe 102 in real time, at power up and periodically in real time during flight of the airframe as follows.

At step 410, controller 160 measure arm impulses along arms that extend from a body of airframe 102 to a propulsion source (not shown) on the arm, using one or more resistive force sensors (RFSs) mounted inside the arms.

For this example, step 410 may include measuring stress using all of RFS versions of sensors 128, 138, 148 and 158; or one or more of sensors 328 such as described for FIGS. 1-3C.

After this embodiment of step 410, at step 420, controller 160 may determine a metric on a health of airframe in real time based on measure impulses along the arms 120-150 as detected in outputs of RFSs, at step 410.

Figure 4D:
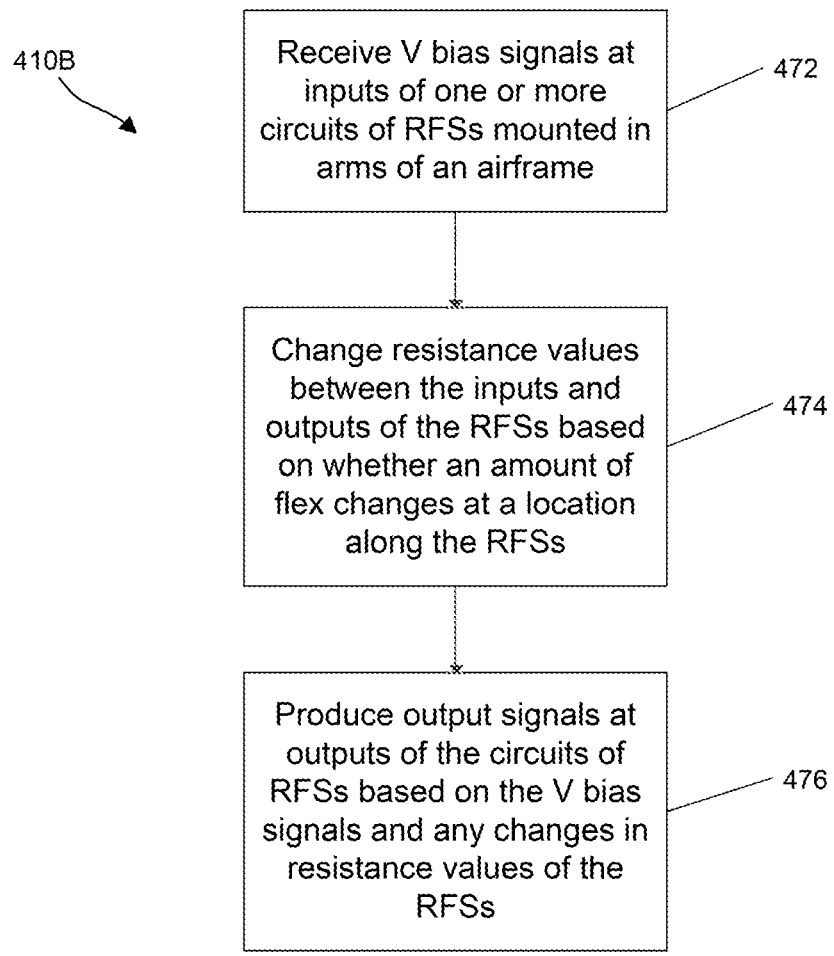
FIG. 4D is a flow chart describing one embodiment of a process for measuring stress at an airframe using RFSs mounted in arms of the airframe.

For example, FIG. 4D is a flow chart describing one embodiment of process 410B for monitoring the health of airframe 102 that includes measuring stress at the airframe using one or more RFSs 328 or flex sensors mounted in arms of the airframe. Process 410B may be one embodiment of step 410 of process 400.

Process 410B begins with step 472 where V bias signals 322 are received at inputs of circuits 350 or 350A-D of one or more RFSs 328 mounted in arms of airframe 102. V bias signals 322 may be received at inputs of circuits 350 or 350A-D through electrical connections 127, 138, 147 and 157 as described for FIGS. 1, 3B, 3C and step 410.

At step 474 resistance values may change between the inputs and outputs of the RFSs 328 of circuits 350 or 350A-D based on whether an amount of flex changes at a location along the RFSs 328. Changing resistance values of the RFSs 328 may be in response to flex impulses or bending at one or more locations along the RFSs 328 as described for FIGS. 3B, 3C and step 410.

Next, at step 476 output signals 324 are produced at outputs of the circuits 350 or 350A-D of RFSs 328 based on the V bias signals 322 and any changes in the resistance values of the RFSs 328. Producing output signals 324 may be in response to or based on the V bias signals 322, ground signal GND, and any changes in the resistance values of the RFSs 328 as described for FIGS. 3B, 3C and step 410.

Figure 4E:
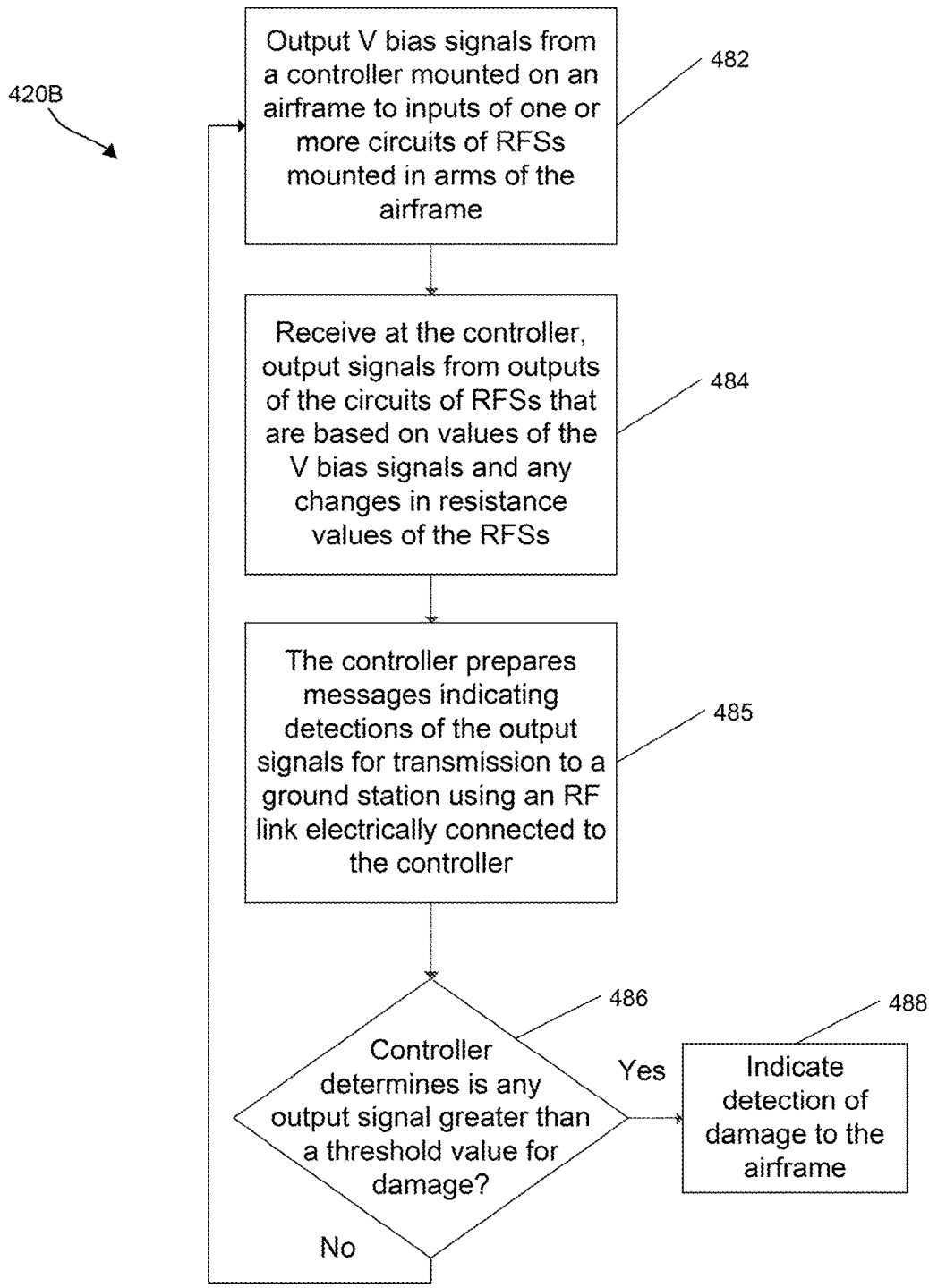
FIG. 4E is a flow chart describing one embodiment of a process for determining a metric on a health of an airframe, and whether the airframe is damaged or has a fault, based on output of RFSs mounted in arms of the airframe.

FIG. 4E is a flow chart describing one embodiment of process 420B for monitoring the health of airframe 102 that includes controller 160 determining a metric on a health of airframe, and whether the airframe is damaged or has a fault, based on output of the circuits 350 of one or more RFSs 328 or flex sensors mounted in arms of the airframe. Process 420B may be one embodiment of step 420 of process 400.

Process 420B begins with step 482 where V bias signals 322 are output from controller 160 mounted on airframe 102 to inputs of one or more circuits 350 or 350A-D of RFSs 328 mounted in arms of the airframe. V bias signals 322 may be voltages output from controller 160 through electrical connections 127, 138, 147 and 157 to the inputs of circuits 350 or 350A-D as described for FIGS. 1, 3B, 3C and step 420.

At step 484 controller 160 receives output signals 324 from outputs of the circuits 350 or 350A-D of RFSs 328 that are based on values of the V bias signals 322 and any changes in resistance values of the RFSs 328.

Receiving output signals 324 at controller 160 may be through electrical connections 127, 138, 147 and 157 from outputs of the circuits 350 or 350A-D of RFSs 328 as described for FIGS. 1, 3B, 3C and 420. Receiving output signals 324 at controller 160 based on values of the V bias signals 322, ground signal GND, and any changes in resistance values of the RFSs 328 as described for FIGS. 3B, 3C and step 420.

At step 485 controller 160 preparing messages indicating detections of the output signals 324 for transmission to ground station 270 using an RF link 164 electrically connected to the controller. In some cases, step 485 may also include storing output signals 324 in memory 162 of the aircraft. In one embodiment, at step 485, output signals 324 may be stored in memory 162 and/or transmitted using RF link 164 to ground station 270 as telemetry data, for subsequently determining a metric on the health of the airframe as described for FIGS. 2, 3B, 3C and step 420 (and optionally step 430 and/or 440).

At step 486, controller 160 determines if any of output signals 324 of the circuits 350 or 350A-D is greater than a threshold value for determining a fault of the airframe 102 or damage to the airframe. Determining if any of output signals 324 is greater than a threshold value may include comparing each of output signals 324 of the circuits 350 or 350A-D with an acceptable value set during calibration, to determine if there is damage to the airframe, as described for FIGS. 3B, 3C and step 420.

If none of output signals 324 of the circuits 350 or 350A-D is greater than the threshold for the circuit at step 486, then process 420B returns to step 482.

If any of output signals 324 of the circuits 350 or 350A-D is greater than a threshold for that circuit at step 486, then process 420B continues to step 488. At step 488 detection of damage to the airframe or a fault of the airframe is indicated. Step 488 may include controller 160 shutting down the aircraft, storing the outputs in memory 162, and/or sending a message through RF link 164 to ground station 270, as described for FIGS. 2, 3B, 3C and step 420 (and optionally step 430 and/or 440 below).

Processes 410B and 420B may monitor health of airframe 102 by using system 100 to determine a metric on the health of the airframe. In one embodiment, processes 410B and 420B are performed by controller 160, and optionally include performance by station 270.

As discussed, after step 420, at optional step 430, controller 160 may transmit a message, in real time, indicating detection of the status of airframe 102 to ground station 270 using RF link 164 electrically coupled to the controller. Step 430 may include RF link 164 transmitting a status of airframe 102, such as a status determined based on output the sensors of step 410, in a message to station 270, in real time (e.g., see FIGS. 2A-B).

In step 430, a fault or damage detected at power up or during flight by controller 160 at step 420 can be stored in memory 162 of the aircraft by controller 160, and/or transmitted by RF link 164 to ground station 270 to indicate non-functionality of airframe 102 at power up or during flight. As a result of this detection, controller 160 may send a command causing the aircraft to discontinue powering up or discontinue flying (e.g., stop in the competition or race of the aircraft), land and/or to power down the aircraft.

In step 430, a metric on a health of the airframe detected by controller 160 in real time, at power up and periodically in real time during flight of the airframe can be stored in memory 162 of the aircraft by controller 160, and/or transmitted by RF link 164 to ground station 270 to provide telemetry data, such as arm impulses for later analysis.

After step 430, at optional step 440, ground station 270 or controller 276 detects a real time airframe status or damage at the ground station based on the transmitted radio frequency signal received from RF link 164 (e.g., from controller 160). Step 440 may include ground station 270 receiving the signal from RF link 164 and controller 276 detecting the real time airframe status based on the status indicated in the transmitted radio frequency signal.

In step 440, a fault or damage detection at power up or during flight, received in a message by controller 276, can be stored in memory 272, and/or transmitted to computer 279 (e.g., for display to a ground station user). As a result of this detection, step 440 may include controller 276 sending a command via RF link 274 to link 164 causing controller 160 to discontinue flying the aircraft (e.g., stop in the competition or race of the aircraft), to land and/or to power down the aircraft.

In step 440, a metric on a health of the airframe at power up or periodically during flight, received in messages by controller 276, can be stored in memory 272 to provide telemetry data, such as arm impulses for later analysis (e.g. by station 270 or computer 279).

For some embodiments, performing an act or event "periodically" herein may be at a period of between 1 microsecond and 1 second. In some cases, it may be at a periodic period of between 1 and 500 milliseconds. In some cases, it may at a periodic period of between 20 and 70 milliseconds. In some cases, it may be at a periodic period of between 1 and 500 microseconds. In some cases, it may at a periodic period of between 20 and 70 microseconds. For some embodiments, "periodically" determining a status of the airframe or "periodically" comparing stresses measured may include polling the output of the pressure sensors at power on (e.g., of the aircraft or of controller 160) and "periodically" in real time after power on.

For some embodiments, setting acceptable baseline arm stress values for the multiple points during a calibration process includes having (e.g., obtaining) a controller 160 (e.g., a microcontroller reset) that was reset with new firmware (e.g., ROM data) at a factory that produces or packages the controller. Then, setting may include connecting the output of the sensors (mounted or not yet mounted on airframe 102) to the controller (and the inputs, see FIGS. 3A-C). Then, setting may include calibrating the sensor output of the sensors after they are mounted on airframe 102, during rest of the airframe, such as at power on of the aircraft. This calibration may provide an output signal (e.g., voltage) that is a sensor nominal state output threshold.

For the ribbon sensors, the nominal threshold may be based on not having any impacts on the ribbon sensors on the surface of the airframe. From the nominal threshold, the acceptable baseline arm stress values for multiple points along the sensor (e.g., and airframe surface where the sensor is mounted) can be selected or set (during this calibration process) based on the sensor nominal state output thresholds. These arm stress values may be upper stress values a certain percentage above the nominal threshold. In one embodiment, the nominal state output threshold may be set to an output voltage value for output 356 being 0 ohms (e.g., a setting for no pressure on the sensor), and the upper stress value may be set to a voltage value for output 356 being a few hundred thousand ohms or an open circuit (e.g., a setting for a severe impact that does permanently damage to the surface of an arm or that is a fault of the airframe) (e.g., see FIG. 3A).

The nominal threshold may be based on not having any flex of a flex sensors in the arms of the airframe. From the nominal threshold, the acceptable baseline arm stress values for arm impulses measured along the sensor (e.g., inside an arm where the sensor is mounted) can be selected or set (during this calibration process) based on the sensor nominal state output threshold. These arm stress values may be an upper stress value a certain percentage above and a lower stress value certain percentage below the nominal threshold. In one embodiment, the nominal state output threshold may be set to an output voltage value for output 324 being a flat resistance of 10K Ohms±30% (e.g., a setting for no bend in the pressure sensor in the arm), and the upper stress value may be set to a voltage value for output 324 being between 1.2 and 2 times greater than the flat resistance (e.g., a setting for a severe bend of the arm) (e.g., see FIG. 3B).

The upper and lower stress value percentages may be reset based on the telemetry analysis results or changes in the nominal outputs during subsequent calibrations. Also, the nominal outputs may be changed based on the (e.g., recalibrate after) telemetry analysis results or significant differences in comparisons by controller 160 of sensor outputs expected for and actual outputs of open circuit and/or short circuit readings (e.g., see FIGS. 3A-C). The nominal outputs may also be changed based on the telemetry analysis results or significant differences in comparisons by controller 160 of sensor outputs expected for and actual outputs of metrics on the health of the airframe (such as arm flex) detected during power up or flight of the aircraft (e.g., see FIGS. 3B-C).

In some embodiments, the monitoring of process 400 may include measuring stress for airframe health monitoring, and using the measured stress to determine if there is airframe damage, to determine whether there is an airframe fault, or to provide metrics on the health of the airframe (e.g., based on telemetry data, such as arm impulses such as described for FIGS. 3A-C) during power up (e.g., of the controller or aircraft), such as described in FIG. 5 below, or during flight of the aircraft, such as described in FIGS. 6-7 below. In some embodiments, if controller 160 determines a fault during flight of the aircraft, it powers down the aircraft so it immediately drops to the ground or gently lands. In another embodiment, upon receiving a message from controller 160 that there is a fault during flight of the aircraft, ground station 270 sends a command to controller 160 to power down the aircraft so it immediately drops to the ground or gently lands.

Figure 5:
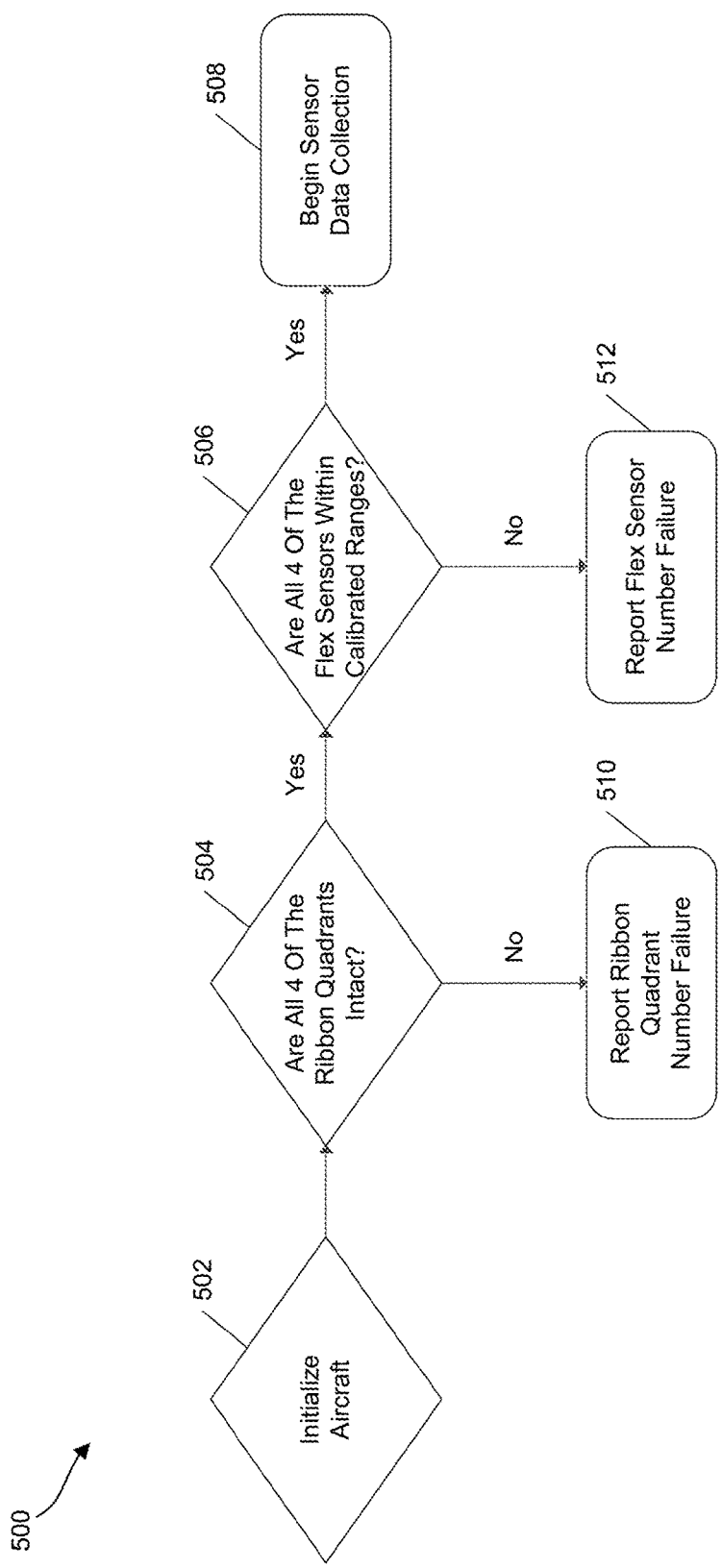
FIG. 5 is a flow chart describing one embodiment of a process for monitoring the health of an airframe at power up of an aircraft.

FIG. 5 is a flow chart describing one embodiment of process 500 for monitoring the health of airframe 102 by determining a status of the airframe at power up of an aircraft having the airframe, based on the output of FSR sensors or ribbon sensors mounted on surfaces the airframe; and RFSs or flex sensors mounted in arms of the airframe. In one embodiment, process 500 may monitor the health of airframe 102 in real time using system 100, such as at or during power up. In one example, process 500 may be an embodiment of performing steps 410 and 420 to determine a status of the airframe, during power up of an aircraft having system 100.

Also, one example of step 508 of process 500 may begin an embodiment of performing steps 410 and 420 during flight of an aircraft having system 100. In one embodiment, after step 508, a process for monitoring the health of airframe 102 in real time using system 100 may continue to step 602 of process 600 of FIG. 6, and/or step 702 of process 700 of FIG. 7.

Process 500 starts with step 502, where the aircraft or controller 160 is initialized. Initializing may include powering up the aircraft, powering up the pressure sensors (e.g., one or more of sensors 115, 128, 138, 148, 158, 220, 230, 240, 250; circuits 300A-D and/or circuits 350A-D), and/or powering on controller 160, such as by providing them with initial and continued electrical power (e.g., switching them on) after they were not provided any electrical power (e.g., were switched off). The aircraft, sensors and/or controller 160 may be powered on from a battery mounted in aircraft 200, or from a wireless power receiver mounted in aircraft 200. In one embodiment, step 502 describes the occurrence of "at power on" or "at power up" as mentioned herein.

After step 502, at step 504, controller 160 determines whether all four ribbon quadrants of airframe 102 are intact, at power up. Here, determining whether the four ribbon quadrants are intact may include determining whether there is airframe damage or an airframe fault at any of arms 120, 130, 140 and 150 (e.g., the four ribbon quadrants) during power up, based on outputs of FSR sensor version of sensor 115; FSR sensor versions of sensors 220, 230, 240 and 250; or circuits 300A-D. This determination may include controller 160 or system 100 determining that none, one, or more than one quadrant (e.g., arm) is physically damaged or has a physical fault, and therefore is not intact. In a first example, this determination may include using sensor 115; sensors 220, 230, 240 and 250; or circuits 300A-D to detect such damage or fault at any of the arms, such as describe for FIGS. 1-4C. In another example, this determination may include descriptions for steps 410 and 420 of process 400 of FIGS. 4A-C, for detecting such damage or fault at any of the arms. In one embodiment, if one of these RFS sensors fails a check during power on such as by processor determining that there is such damage or fault, airframe 102 is deemed diagnostically un-flyable. In some embodiments, this determination may be described as controller 160 or system 100 determining a status of airframe 102 in real time, at power up, by determining whether the airframe has a fault at power up based on the output of the one or more pressure sensors.

If any of the four ribbon quadrants are not intact at step 504, process 500 continues to step 510 where controller 160 reports the number(s) of the four ribbon quadrants (e.g., arms) of airframe 102 that are not intact as failures, at power up. This may include controller 160 causing transmission of a message indicating the failure(s) from RF link 164 to ground station 276 (e.g., to RF link 274 and controller 276), at power up. This reporting may include controller 160 or system 100 reporting that one, or more than one quadrant (e.g., arm) is physically damaged or has a physical fault, and therefore is not intact, at power up.

In a first example, this reporting may include transmitting a message from the aircraft to ground station 276 reporting damage or fault at any of sensor 115; sensors 220, 230, 240 and 250; or any of circuits 300A-D, such as describe for FIGS. 1-4C. In another example, this reporting may include descriptions for step 430 and optionally 440 of process 400 of FIGS. 4A-C, for receiving such a message, and detecting such damage or fault at ground station 276.

In these examples, this reporting may include controller 160 and/or controller 276 (e.g., from RF link 278 to RF link 168) sending a command causing the aircraft to discontinue powering up (e.g., stop in the competition or race of the aircraft), and/or to power down the aircraft, such as described step 430 and optionally 440 of process 400.

If all of the four ribbon quadrants are intact at step 504, process 500 continues to step 506 where controller 160 determines whether all four of the flex sensors are within calibrated ranges for each sensor, at power up. Here the calibrated ranges at step 506 may be "acceptable baseline arm stress values for arm impulses measured along the sensor"; and/or "upper and lower stress value percentages," as described herein.

Here, determining whether all four of the flex sensors are within calibrated ranges may include determining a metric on a health of airframe 102 (e.g., based on telemetry data, such as arm impulses) at any of arms 120, 130, 140 and 150 during power up, based on outputs of a RFSs version of sensors 128, 138, 148 and 158; or outputs of circuits 350A-D, such as describe for FIGS. 1-4A and 4D-E.

In some cases, this determination may include controller 160 or system 100 determining that none, one, or more than one of the flex sensors are not within calibrated ranges. In a first example, this determination may include using sensors 128, 138, 148 and 158; or circuits 350A-D to determine a metric on the health of airframe 102 in real time, such as describe for FIGS. 1-34A and 4D-E. In another example, this determination may include descriptions for steps 410 and 420 of process 400 of FIGS. 4A and 4D-E, for determining such a metric of at any of arms 120, 130, 140 and 150 in real time based on the arm impulses measured along these arms of the airframe as detected in the output of the one or more pressure sensors at step 410.

In these examples, the arm impulses may include impulse time, a maximum impulse value, a minimum impulse value, and/or a largest impulse deviation. Also, determining the metric may include controller 160 and/or 276 creating a profile of arm flex according to thrust for the arm by comparing over time, the arm impulses with at least one of a throttle input vector from a pilot for a propulsion source on the arm, or an electronic speed control input vector for the propulsion source. This profile may indicate a flex or bend of the arm as compared to the force output by the propulsion source. In one embodiment, determining that a flex sensor is not within a calibrated range may include controller 160 and/or 276 determining that the profile of arm flex according to thrust for an arm at rest (e.g., the propulsion source for that arm is not powered up or providing any propulsion) is not within a calibrated range for that arm, when the arm is resting.

In a second embodiment, determining that a flex sensor is not within a calibrated range may include controller 160 and/or 276 determining that the profile of arm flex according to thrust for an arm that is flexed (e.g., due to the propulsion source for that arm being powered up and providing propulsion) is not within a calibrated range for that arm, when the arm is flexed. In this second embodiment, creating the profile of arm flex may include weighing down or holding down (e.g., to a single vertical height) a center of airframe 102 during a period of time while the propulsion sources on one or more of arms 120-150 are providing propulsion, and measuring the arm impulses during this period to create the profile. Here, providing propulsion may include sending a command from controller 160 that causes the propulsion output to be between 70 and 90 percent of maximum power. In some cases, providing propulsion here may include sending a command that causes the propulsion output what is considered a high amount (e.g., between 80 and 100 percent) of maximum acceleration during/for flight. In some embodiments, this determination may be described as controller 160 and/or 276 (or system 100) determining a status of airframe 102, by determining a metric on a health of the airframe in real time at power up based on the output of the one or more pressure sensors.

If any of all four of the flex sensors are not within calibrated ranges at step 506, process 500 continues to step 512 where controller 160 and/or 276 reports the number(s) of the four flex sensors (e.g., arms) of airframe 102 that are not within calibrated ranges as failures, at power up. This may include controller 160 causing transmission of a message indicating the failure(s) from RF link 164 to ground station 276 (e.g., to RF link 274 and controller 276), at power up. This reporting may include controller 160 or system 100 reporting that one, or more than one flex sensor (e.g., arm) is not within calibrated ranges, at power up.

In a first example, this reporting may include transmitting a message from the aircraft to ground station 276 reporting the failure at any of sensors 128, 138, 148 and 158; or circuits 350A-D at any of the arms, such as describe for FIGS. 1-4A and 4D-E. In a second example, this reporting may include descriptions for step 430 and optionally 440 of process 400 of FIG. 4A, for receiving such a message, detecting such a metric, or calculating such a profile of arm flex at ground station 276. In these examples, this reporting may include controller 160 and/or controller 276 (e.g., from RF link 278 to RF link 168) sending a command causing the aircraft to discontinue powering up (e.g., stop in the competition or race of the aircraft), and/or to power down the aircraft, such as described step 430 and optionally 440 of process 400.

If all of the four flex sensor are within calibrated ranges at step 506, process 500 continues to step 508 where controller 160 begins sensor data collection. In some embodiments, beginning sensor data collection at step 508 includes initializing sensor data collection at step 602 of FIG. 6 or at step 702 of FIG. 7. In some case, it may include both, initializing sensor data collection at step 602 of FIG. 6 and at step 702 of FIG. 7. In these cases, after step 602, process 600 may continue as describe for FIG. 6, and after step 702, process 700 may continue as described for FIG. 7.

Figure 6:
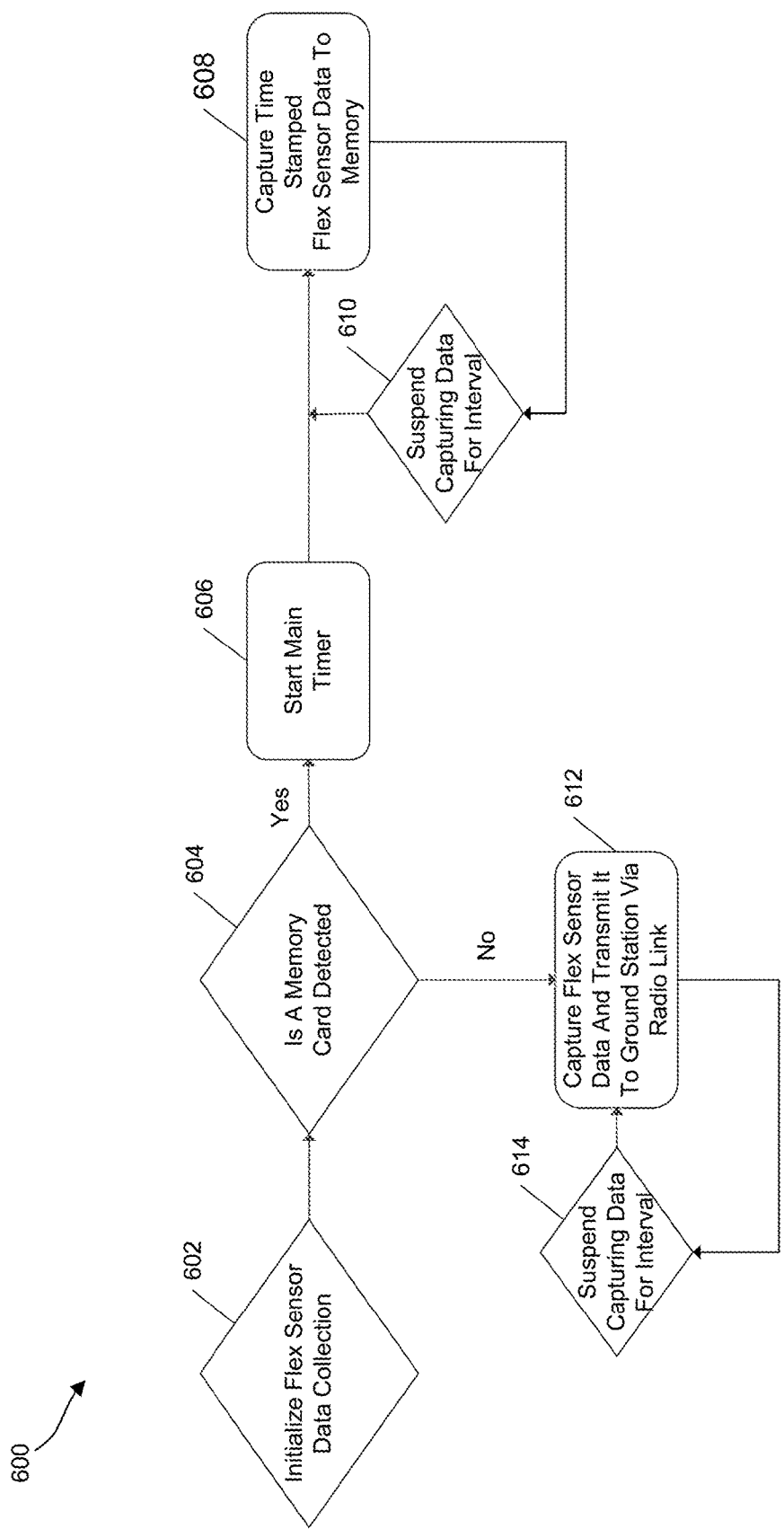
FIG. 6 is a flow chart describing one embodiment of a process for monitoring the health of an airframe by determining a status of the airframe periodically during flight of the aircraft.

FIG. 6 is a flow chart describing one embodiment of process 600 for monitoring the health of airframe 102 by determining a status of the airframe periodically during flight of the aircraft, based on the output of RFSs or flex sensors mounted in arms of the airframe. In one embodiment, process 600 may monitor the health of airframe 102 in real time using system 100, such as after power up and/or during flight. In one example, process 600 may be an embodiment of performing steps 410 and 420 to determine a status of the airframe, after power up of an aircraft having system 100, such as periodically during flight of the aircraft. Also, in one example of process 600, step 602 may occur after step 508 of FIG. 5. In one embodiment, process 600 is performed by controller 160, and optionally station 270, after power up (e.g., after powering up the aircraft, powering on controller 160 and/or during flight of the aircraft).

Process 600 starts with step 602, where flex sensor data collection is initialized. This may include initializing controller 160 for periodically collecting sensor data during flight from flex sensors. These sensors may be sensors 128, 138, 148 and 158; or circuits 350A-D, such as described below for steps 606, 608 and 610. In one embodiment, step 602 describes the occurrence of "periodically in real time after power on of the controller" or "periodically in real time during flight of the airframe" as mentioned herein.

After step 602, at step 604 it is determined whether a memory card detected on the aircraft. This may include detecting whether memory 162 exists on the aircraft or on airframe 102. This detection may be a mechanical, electronic or electromechanical detection of the presence and/or electronics of the memory card. In one embodiment, this detection may detect whether a flash memory, thumb drive, or secure digital (SD) card is on the aircraft and properly mechanically and electronically (e.g., via the electrical connection) interfaced with controller 160.

If a memory card is not detected on the aircraft at step 604, process 600 continues to step 612 where controller 160 captures (e.g., receives) pressure sensor data from all four of the flex sensors, periodically in real time after power up (e.g., after powering up the aircraft, powering on controller 160 and/or during flight of the aircraft). Step 604 also includes transmitting this data to ground station 276 by sending it from RF link 164 to RF link 278. Here, capturing and transmitting the sensor data from all four of the flex sensors may include determining a metric on a health of airframe 102 (e.g., based on telemetry data, such as arm impulses) at all of arms 120, 130, 140 and 150 after power up, based on outputs of a flex sensor version of sensors 128, 138, 148 and 158; or outputs of circuits 350A-D.

In one example of step 612, this capturing and transmitting the sensor data may include using sensors 128, 138, 148 and 158; or circuits 350A-D to determine a metric on the health of airframe 102 in real time, such as describe for FIGS. 1-4A and 4D-E. In another example, this capturing and transmitting the sensor data may include descriptions for steps 410 and 420 of process 400 of FIGS. 4A and 4D-E, for determining such a metric of at any of arms 120, 130, 140 and 150 in real time based on the arm impulses measured along these arms of the airframe as detected in the output of the one or more pressure sensors at step 410.

In these examples, at step 612, controller 160 may transmit the arm impulse data of the four sensors 128, 138, 148 and 158; or circuits 350A-D (e.g., for arms 120, 130, 140 and 150) of airframe 102 periodically in real time to ground station 270, such as described for steps 430 and optionally 440 of process 400. In some cases, this transmitting may be similar to step 512 but for transmitting the data as opposed to a fault.

Also, in these examples, similar to step 506, the arm impulses may include impulse time, a maximum impulse value, a minimum impulse value, and/or a largest impulse deviation. Also, at step 612, this capturing and transmitting the sensor data may include controller 160 and/or 276 creating a profile of arm flex, similar to step 506.

In one embodiment, at step 612, this capturing and transmitting the sensor data may include controller 160 and/or 276 determining the profile of arm flex according to thrust for an arm that is flexed (e.g., due to the propulsion source for that arm being powered up and providing propulsion), when the arm is flexed. Here, providing propulsion may include sending various commands from controller 160 that causes the propulsion output to be a proper amount for flying the aircraft, including during a race of the aircraft. In some embodiments, this capturing and transmitting the sensor data may be described as controller 160 and/or 276 (or system 100) determining a status of airframe 102, by determining a metric on a health of the airframe in periodically in real time during flight of the airframe, or after power on of the controller, based on the output of the pressure sensors 128, 138, 148 and 158; or of circuits 350A-D. In some cases, this determining a metric may include controller 160 or system 100 determining that none of the flex sensors are not within calibrated ranges, similar to step 506 of process 500. In other cases, this determining a metric may include controller 160 or system 100 determining that one, or more than one of the flex sensors are not within calibrated ranges, similar to step 506 (e.g., including similar to the first and second example of step 506) of process 500.

At step 612, the arm impulses may be similar to those listed for step 506; and determining a metric may include controller 160 and/or 276 creating a profile of arm flex, similar to step 506. In one embodiment, at step 612, determining that a flex sensor is not within a calibrated range may include controller 160 and/or 276 determining that the profile of arm flex according to thrust for an arm that is flexed (e.g., due to the propulsion source for that arm being powered up and providing propulsion) is not within a calibrated range for that arm, when the arm is flexed, similar to step 506. In one embodiment, at step 612, if any of all four of the flex sensors are not within calibrated ranges, controller 160 and/or 276 may reports flex sensors (e.g., arms) that are not within calibrated ranges as failures after power up, and may send a command causing the aircraft to discontinue powering up, and/or to power down the aircraft, such as described at step 512.

After step 612, at step 614, controller 160 capturing and transmitting pressure sensor data from all four of the flex sensors, periodically in real time after power up is suspended for a time interval. Here, suspending may include sleeping or switching off receipt or capture of the output of sensors 128, 138, 148 and 158; or of circuits 350A-D by controller 160 after power up. In one embodiment, at step 614, the capturing and transmitting of pressure sensor data at step 612 is periodically suspended by the time intervals to cause the sensor data to be "periodically" captured and transmitted at the time intervals as described herein. In one embodiment, it may suspended for a periodic time interval or period of between 20 and 70 microseconds.

After step 614, process 600 returns to step 612, where controller 160 captures and transmits pressure sensor data from all four of the flex sensors, periodically in real time after power up.

If a memory card is detected on the aircraft at step 604, process 600 continues to step 606 where controller 160 starts a main timer for capturing (e.g., receiving) time stamped pressure sensor data from all four of the flex sensors. In some cases, step 606, may include controller 160 starting a main timer of the controller that provides temporal data for time stamping the sensor data from all four of the flex sensors. In other cases, step 606, may include starting a main timer of another component of the aircraft electrically connected to controller 160 to provide that temporal data.

After step 606, process 600 continues to step 608 where controller 160 captures to memory (e.g., receives and stores in memory 162) pressure sensor data from all four of the flex sensors, periodically in real time after power up. Here, capturing to memory may include controller 160 receiving the data from the (e.g., outputs of) sensors 128, 138, 148 and 158; or of circuits 350A-D, and storing that data in memory 162. Prior to storing that data in the memory, step 608 may also include controller 160 time stamping the captured pressure sensor data received from all four of the flex sensors, using the temporal data received from the main timer of step 606. Here, capturing to memory the sensor data from all four of the flex sensors may include determining a metric on a health of airframe 102 (e.g., based on telemetry data, such as arm impulses) at all of arms 120, 130, 140 and 150 after power up, based on outputs of a flex sensor version of sensors 128, 138, 148 and 158; or of circuits 350A-D.

In one example of step 608, this capturing to memory the time stamped sensor data may include using sensors 128, 138, 148 and 158; or circuits 350A-D to determine a metric on the health of airframe 102 in real time, such as describe for FIGS. 1-4A and 4D-E. In a second example, this capturing to memory the time stamped sensor data may include descriptions for steps 410 and 420 of process 400 of FIGS. 4A and 4D-E, for determining such a metric of at any of arms 120, 130, 140 and 150 in real time based on the arm impulses measured along these arms of the airframe as detected in the output of the one or more pressure sensors at step 410. In these examples, at step 608, controller 160 may store in memory 162 the time stamped arm impulse data of the four FSR sensors 128, 138, 148 and 158; or circuits 350A-D, periodically in real time, such as described for step 430 of process 400. Also, in these examples, similar to step 506, the arm impulses may include impulse time, a maximum impulse value, a minimum impulse value, and/or a largest impulse deviation. Also, at step 608, this capturing to memory the time stamped sensor data may include controller 160 and/or 276 creating a profile of arm flex, similar to step 506. In one embodiment, at step 608, this capturing to memory the time stamped sensor data may include controller 160 and/or 276 determining the profile of arm flex according to thrust for an arm that is flexed (e.g., due to the propulsion source for that arm being powered up and providing propulsion as described for step 612), when the arm is flexed. In some embodiments, this capturing to memory the sensor data may be described as controller 160 and/or 276 (or system 100) determining a status of airframe 102, by determining a metric on a health of the airframe in periodically in real time during flight of the airframe, or after power on of the controller, based on the output of the pressure sensors 128, 138, 148 and 158; or of circuits 350A-D. In some cases, this determining a metric may include controller 160 or system 100 determining that none, one, or more than one of the flex sensors are not within calibrated ranges; may include sending a failure message; and/or may include sending a command causing the aircraft to discontinue powering up, and/or to power down the aircraft, such as described at step 612.

After step 608, at step 612, controller 160 suspends for a time interval, capturing to memory the time stamped pressure sensor at step 608. Here, suspending may be the same as that at step 614 except that here controller 160 suspends storing the time stamped data in memory 162, instead of suspending transmitting the sensor data to station 270 as in step 614. In one embodiment, it may also be difference because here, the suspension may be for a periodic time interval or period of between 20 and 70 milliseconds.

After step 610, process 600 returns to step 608, where controller 160 captures to memory the time stamped pressure sensor data from all four of the flex sensors, periodically in real time after power up.

Figure 7:
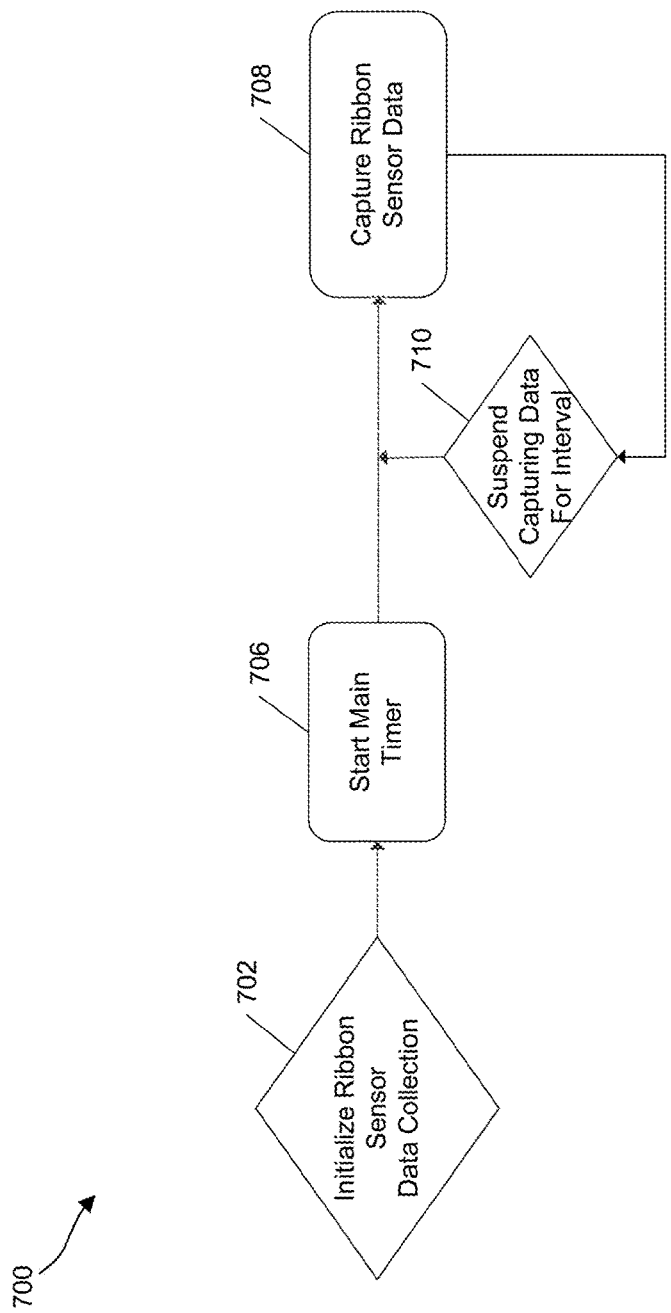
FIG. 7 is a flow chart describing one embodiment of a process for monitoring the health of an airframe by determining whether the airframe has a fault or is damaged periodically during flight.

FIG. 7 is a flow chart describing one embodiment of process 700 for monitoring the health of an airframe by determining whether airframe 102 is damaged periodically during flight, based on the output of FSR sensors or ribbon sensors mounted on surfaces of the airframe. In one embodiment, process 700 may monitor the health of airframe 102 in real time using system 100, such as after power up and/or during flight. In one example, process 700 may be an embodiment of performing steps 410 and 420 to determine whether the airframe is damaged, after power up of an aircraft having system 100, such as periodically during flight of the aircraft. Also, in one example of process 700, step 702 may occur after step 508 of FIG. 5. In one embodiment, process 700 is performed by controller 160, and optionally station 270, after power up (e.g., after powering up the aircraft, powering on controller 160 and/or during flight of the aircraft).

Process 700 starts with step 702, where ribbon sensor data collection is initialized. This may include initializing controller 160 for periodically collecting sensor data during flight from sensor 115; sensors 220, 230, 240 and 250; or circuits 300A-D, such as described below for steps 706, 708 and 710. In one embodiment, step 702 describes the occurrence of "periodically in real time after power on of the controller" or "periodically in real time during flight of the airframe" as mentioned herein.

After step 704, process 700 continues to step 706 where controller 160 starts a main timer for capturing (e.g., receiving) time stamped pressure sensor data from ribbon sensors, such as FSR sensor versions (e.g., described as "FSRs" below) of sensor 115; FSRs 220, 230, 240 and 250; or circuits 300A-D. In some cases, step 706, may include controller 160 starting a main timer of the controller that provides temporal data for time stamping the sensor data from all of the FSRs. In other cases, step 706, may include starting a main timer of another component of the aircraft electrically connected to controller 160 to provide that temporal data.

After step 708, at step 706, controller 160 captures sensor data from the FSRs, periodically in real time after power up. Here, controller 160 may determine whether all the FSRs are intact, periodically in real time after power up. This may include or be the same as controller 160 determining whether all the four ribbon quadrants of airframe 102 are intact, as described for step 504, except that in step 708 controller 160 determines if the sensors/quadrants are intact, "periodically" as described for step 608 or as described for "periodically" herein, instead of at power on as for step 504. Thus, here, determining whether the four ribbon quadrants are intact may include determining whether there is airframe damage or an airframe fault at any of arms 120, 130, 140 and 150 (e.g., the four ribbon quadrants) during power up, based on outputs of FSR sensor version of sensor 115; or sensors 220, 230, 240 and 250; or outputs of circuits 300A-D, such as described for steps 410 and 420; or at step 504 and the three examples described for step 504. In some embodiments, this determination may be described as controller 160 or system 100 determining a status of airframe 102, by determining whether the airframe has a physical fault or has become damaged, periodically in real time after power up (e.g., after powering up the aircraft, powering on controller 160 and/or during flight of the aircraft), based on the output of the one or more pressure sensors.

If any of the FSRs are not intact at step 708, step 708 may include controller 160 reporting the FSRs (e.g., arms) of airframe 102 that are not intact as failures, periodically in real time after power up. This may include controller 160 causing transmission of a message indicating the failure(s) from RF link 164 to ground station 276 as described for step 510, but periodically in real time after power up instead of at power up. For example, this reporting may include controller 160 or system 100 using RF link 164 coupled to controller 160 to transmit a message indicating the failure (e.g., detection of the fault or damage) to ground station 276, in real time after power up.

In some embodiments, this reporting may include controller 160 or system 100 storing the failure (e.g., detection of the fault or damage) in memory 162, in real time after power up. This reporting may include controller 160 and/or controller 276 sending a command causing the aircraft to discontinue powering (e.g., stop in the competition or race of the aircraft), and/or to power down the aircraft, in real time after power up, such as described step 510, or at step 430 and optionally 440 of process 400.

After step 708, at step 710, controller 160 suspends for a time interval, capturing pressure sensor at step 708. Here, suspending may be the same as that at step 614.

After step 710, process 700 returns to step 708, where controller 160 captures pressure sensor data from the ribbon sensors, periodically in real time after power up.

In some embodiments, controller 276 and/or controller 160 include or are also in communication with a RAM and/or ROM, which is a local volatile memory for that controller. This RAM and/or ROM can be any type of volatile storage (e.g., DRAM, SRAM, etc.). In one embodiment, this RAM and/or ROM stores code (software and/or firmware) that programs controller 276 and/or controller 160 to perform the functions described herein for determining the status of airframe 102 or for an airframe status monitoring system. In another embodiment, controller 276 and/or controller 160 include custom hardware (FPGAs, ASICS, etc.), with or without software, to perform the functions described herein for determining the status of airframe 102 or for an airframe status monitoring system.

In some embodiments, controller 276 and/or controller 160 can have various functionality in addition to the specific functionality described herein. For example, controller 160 can receive image data from a camera mounted on airframe 102 and transmit that data to ground station 276 or a tower connected to a "base" station. It can also receive flight commands from to ground station 276 or the tower, and power the propulsion sources of the aircraft based on those commands.

In one embodiment, the propulsion sources are motors driven propellers. Each arm may have a motor mounted inside or on the distal end of the arm, and the propeller may be above the end of the arm such as to spin in a plane flat with the page of FIGS. 1-2A. It is considered that they may be other types of propulsion sources as known.

In some cases, system 100 may be useful for monitoring the status of airframe 102 that is an airframe of an unmanned aircraft such as a drone. In these cases, airframe 102 may have physical, mechanical and electronic components; 3 to 7 arms (e.g., each having a ribbon sensor around its outside surface and a flex sensor along its inside surface); and at least one source of propulsion (e.g., such as one at the end of each arm). In some embodiments, here airframe 102 may only receive wireless signals for controlling the propulsion sources. It may include cameras, radios, lights and the like. It may include controllers for converting control signals or commands from controller 160 to signals that drive the propulsion sources.

In other cases, system 100 may be useful for monitoring the status of airframe 102 that is an airframe of a wire controlled aircraft, an airplane, a jet aircraft, a personal aircraft, a commercial aircraft, a rocket, or a spacecraft.

The above-discussion describes an automated airframe status monitoring system, an aircraft capable of monitoring its airframe status, and a method of monitoring an airframe status of an airframe, each able to monitor the status of the airframe of an aircraft in real time, at power up and during flight of the aircraft, using a controller that monitors the output of pressure sensors (e.g., forces sensors) mounted on the airframe arms and body. The controller can monitor the output of pressure sensors on the outside surfaces of the airframe to determine a fault of or damage to the airframe, in real time based on the continuity measured along the outside surfaces. The controller can monitor pressure sensors located along inside surfaces of arms of the airframe to determine a metric on the health of the airframe, in real time based on the arm impulses measured along an arm of the airframe. This will lead to less expensive, more accurate, faster, automated detection of airframe faults, airframe damage and/or metrics on the health of the airframe.

One embodiment includes an airframe status monitoring system, comprising: one or more pressure sensors mounted on an airframe, the one or more pressure sensors configured to measure stress at the airframe; and a controller mounted on the airframe and electrically connected to the one or more pressure sensors, the controller configured to determine a status of the airframe in real time based on output of the one or more pressure sensors.

In one embodiment, the controller is configured to determine the status of the airframe by determining in real time whether the airframe has a fault at power up and periodically in real time during flight of the airframe, based on the output of the one or more pressure sensors.

In one embodiment, the controller is configured to determine the status of the airframe by determining a metric on a health of the airframe in real time at power up and periodically in real time during flight of the airframe, based on the output of the one or more pressure sensors.

One embodiment includes an aircraft, comprising: an airframe having a surface that extends around a perimeter of the airframe; one or more force sensors mounted on the surface of the airframe and configured to measure stress at the surface of the airframe; and a controller mounted on the airframe and electrically connected to the one or more force sensors, the controller configured to detect in real time whether the airframe is damaged based on output of the one or more force sensors.

One embodiment includes a method of monitoring an airframe status of an airframe, comprising: measuring stress at a perimeter of the airframe; and determining a status of the airframe in real time based on the stress measured at the perimeter of the airframe.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "type" of objects may refer to a "type" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

The invention claimed is:

1. A system, comprising:
   an airframe including a body and a plurality of arms extending from the body, each arm of the plurality of arms including a respective outer surface of the arm and a respective perimeter of the arm;
   a plurality of force sensitive resistor (FSR) sensors, each FSR sensor of the plurality of FSR sensors mounted on an outer surface of and extending around at least a portion of the perimeter of one of the arms of the airframe, and each FSR sensor of the plurality of FSR sensors configured to measure stress at the outer surface of the one of the arms on which the FSR sensor is mounted; and
   a controller mounted on the airframe and electrically connected to the plurality of FSR sensors, the controller configured to determine a status of the airframe in real time including whether there is at least one of an impact, damage, fault or break at or of the outer surface of one of the arms on which at least one of the FSR sensors is mounted, based on outputs of the FSR sensors.

2. The system of claim 1, wherein:
for each of the FSR sensors there is a respective range of acceptable values;
the controller is configured to determine the status of the airframe by determining, in real time at power up and periodically in real time during flight of the airframe, whether the output of each FRS sensor of the one or more FSR sensors is within the respective range of acceptable values for the FSR sensor.

3. The system of claim 1, further comprising:
a radio frequency (RF) link electrically coupled to the controller and configured to transmit a message indicating the status to a ground station.

4. The system of claim 1, wherein:
the controller is configured to determine in real time whether the airframe has at least one of an impact, damage, fault or break at or of the outer surface of one of the arms on which at least one of the FSR sensors is mounted based on periodically comparing stresses measured in real time at multiple points along the perimeter of the airframe as detected by the FSR sensors, with acceptable baseline stress values for the multiple points set during a calibration process.

5. The system of claim 1, wherein:
the FSR sensors are configured to measure continuity of the outer surface of the arms of the airframe; and
the controller is configured to determine in real time whether the airframe has at least one of an impact, damage, fault or break at or of the outer surface of one of the arms on which at least one of the FSR sensors is mounted based on the measured continuity of the outer surface of the arms of the airframe as detected based on outputs of one or more of the FSR sensors.

6. The system of claim 5, further comprising:
an outer shell that is disposed outside of the outer surface of the airframe.

7. The system of claim 1, wherein:
the controller is configured to determine the status of the airframe by determining a metric on a health of the airframe in real time at power up and periodically in real time during flight of the airframe.

8. The system of claim 7, wherein:
the controller is configured to determine the metric on the health of the airframe in real time based on the output of the one or more FSR sensors.

9. The system of claim 1, wherein:
the plurality of arms that extend from the body of the airframe include at least two arms that each include a respective propulsion source on the arm;
the system further comprises one or more resistive force sensors (RFSs) mounted inside each of the at least two arms that include a respective propulsion source on the arm each, of the RFSs configured to measure impulses along the one of the arms inside of which the RFS is mounted; and
the status of the airframe the controller is configured to determine in real time includes whether an extent of flexing of at least one of the arms, as determined based on outputs of one or more of the RFSs, indicates damage to the at least one of the arms.

10. The system of claim 9, wherein:
the controller is configured to determine a metric on the health of the airframe in real time based on arm impulses measured along each of at least two of the arms of the airframe as detected from the outputs of the RFSs;
the arm impulses comprise at least one of an impulse time, a maximum impulse value, a minimum impulse value, or a maximum impulse deviation; and
determining the metric includes creating a profile of arm flex according to thrust for the arm by comparing over time, the arm impulses with at least one of a throttle input vector from a pilot for a propulsion source on the arm, or an electronic speed control input vector for the propulsion source.

11. An aircraft, comprising:
an airframe including a body and a plurality of arms extending from the body, each arm of the plurality of arms including a respective outer surface and a respective perimeter of the arm;
at least one of the arms of the airframe including a force sensitive resistor (FSR) sensor mounted on an outer surface of and extending around at least a portion of the perimeter of the arm of the airframe, the FSR sensor configured to measure stress at the outer surface of the arm on which the FSR sensor is mounted;
at least two of the arms of the airframe each including a respective propulsion source mounted on the arm of the airframe;
at least one of the arms, which includes one of the propulsion sources mounted on the arm, including a resistive force sensor mounted inside the arm and configured to measure impulses along the arm inside of which the resistive force sensor is mounted; and
a controller mounted on the airframe and electrically connected to the FSR and resistive force sensors, the controller configured to detect in real time whether the airframe is damaged based on outputs of the FSR and resistive force sensors.

12. The aircraft of claim 11, wherein:
the controller is configured to determine in real time whether the airframe is damaged based on stress measured at the outer surface of at least one of the arms of the airframe as detected from the output of the FSR sensor.

13. The aircraft of claim 12, wherein:
the controller is also configured to determine in real time whether the airframe is damaged based on the output of the resistive force sensor.

14. The aircraft of claim 11, wherein:
the controller is configured to poll the outputs of the FSR and resistive force sensors at power on of the controller and periodically in real time after power on of the controller.

15. A method of monitoring a status of an airframe that includes a body and a plurality of arms extending from the body, wherein each arm of the plurality of arms includes a respective outer surface of the arm and a respective perimeter of the arm, the method comprising:
measuring stress at the perimeter of each of at least two of the arms of the airframe using a plurality of force sensitive resistor (FSR) sensors each of which is mounted on the outer surface of and extends around at least a portion of the perimeter of a respective one of the arms; and
determining a status of the airframe in real time based on the stress measured at the perimeter of at least two of the arms of the airframe using the plurality of FSR sensors.

16. The method of claim 15, wherein:
determining the status of the airframe comprises determining in real time whether the airframe has a fault at power up and periodically in real time during flight of the airframe.

17. The method of claim 16, further comprising:
transmitting a radio frequency signal indicating the status to a ground station; and
the ground station detecting a real time airframe fault based on the status indicated in the transmitted radio frequency signal.

18. The method of claim 16, wherein:
determining in real time whether the airframe has the fault includes periodically comparing the stress measured at the perimeter of the airframe in real time for multiple points along the perimeter of each of at least two arms of the airframe with acceptable baseline stress values for the multiple points set during a calibration process.

19. The method of claim 16, wherein:
measuring stress at the perimeter of each of at least two of the arms of the airframe includes measuring continuity of the outer surface of each of at least two of the arms of the airframe; and
determining in real time whether the airframe has the fault includes determining in real time whether the airframe has the fault based on the measured continuity of the outer surfaces of the airframe that extend around arms.

20. The method of claim 15, wherein:
determining the status of the airframe in real time comprises determining a metric on a health of the airframe in real time at power up and periodically in real time during flight of the airframe.

21. The method of claim 20, wherein the plurality of arms that extend from the body of the airframe include at least two arms that each include a respective propulsion source on the arm, the method further comprising:
using one or more resistive force sensors (RFSs), mounted inside each of the at least two arms that include a respective propulsion source on the arm, to measure arm impulses along the arm inside of which the RFS is mounted;
wherein the determining the status of the airframe in real time is also based on the measured arm impulses; and
wherein the arm impulses comprise at least one of an impulse time, a maximum impulse value, a minimum impulse value, or a maximum impulse deviation.

22. The method of claim 15, wherein the determining the status of the airframe includes determining whether there is at least one of an impact, damage, fault or break at or of the outer surface of one of the arms on which at least one of the FSR sensors is mounted, based on outputs of the FSR sensors.

23. The method of claim 15, wherein:
determining the status of the airframe in real time comprises determining a metric on a health of the airframe in real time at power up and periodically in real time during flight of the airframe; and
determining the metric includes creating a profile of arm flex according to thrust for the arm by comparing over time, the arm impulses with at least one of a throttle input vector from a pilot for a propulsion source on the arm, or an electronic speed control input vector for the propulsion source.

* * * * *

UNITED STATES PATENT AND TRADEMARK OFFICE
CERTIFICATE OF CORRECTION

PATENT NO.        : 10,467,825 B2
APPLICATION NO.   : 15/706477
DATED             : November 5, 2019
INVENTOR(S)       : Herlihy et al.

It is certified that error appears in the above-identified patent and that said Letters Patent is hereby corrected as shown below:

In the Claims

Column 31, Lines 56-57, (Claim 9, Lines 7-8): After "the" and before "of", delete "arm each," and insert -- arm, each --.

Signed and Sealed this
Fifteenth Day of September, 2020

Andrei Iancu
*Director of the United States Patent and Trademark Office*